(12) United States Patent
Cannon

(10) Patent No.: US 9,787,156 B1
(45) Date of Patent: Oct. 10, 2017

(54) ENERGY STORAGE APPARATUS FOR STORING ELECTRICAL ENERGY GENERATED BY AN ENERGY SOURCE

(71) Applicant: RIGEL SCIENTIFIC RESEARCH INC., King City (CA)

(72) Inventor: Wayne Harry Cannon, King City (CA)

(73) Assignee: RIGEL SCIENTIFIC RESEARCH INC., King City (CA)

( * ) Notice: Subject to any disclaimer, the term of this patent is extended or adjusted under 35 U.S.C. 154(b) by 0 days.

(21) Appl. No.: 15/240,354

(22) Filed: Aug. 18, 2016

(51) Int. Cl.
| | |
|---|---|
| *H01F 7/20* | (2006.01) |
| *H02K 7/02* | (2006.01) |
| *H02P 25/064* | (2016.01) |
| *F16C 32/04* | (2006.01) |

(52) U.S. Cl.
CPC .......... *H02K 7/025* (2013.01); *F16C 32/048* (2013.01); *F16C 32/0493* (2013.01); *H01F 7/20* (2013.01); *H02P 25/064* (2016.02); *F16C 2380/26* (2013.01)

(58) Field of Classification Search
CPC .. H02K 7/02; H02K 7/06; H02K 7/09; H02K 7/025
USPC ......................................................... 335/291
See application file for complete search history.

(56) References Cited

U.S. PATENT DOCUMENTS

| | | | | |
|---|---|---|---|---|
| 3,683,216 | A * | 8/1972 | Post ....................... | H02K 7/025 310/67 R |
| 4,077,678 | A | 3/1978 | Studer et al. | |
| 4,182,967 | A * | 1/1980 | Jordan .................... | H02K 7/025 310/74 |
| 4,260,914 | A * | 4/1981 | Hertrich .................... | G01P 3/52 310/15 |
| 4,266,180 | A * | 5/1981 | Juvan ..................... | H02K 39/00 290/1 R |

(Continued)

FOREIGN PATENT DOCUMENTS

WO    WO-03088278 A2    10/2003

*Primary Examiner* — Shawki S Ismail
*Assistant Examiner* — Lisa Homza
(74) *Attorney, Agent, or Firm* — Perry + Currier Inc.

(57) ABSTRACT

A system for storing electrical energy generated by an external energy source that includes a ring for storing kinetic energy of rotation, an assembly a control system, and at least two motors/generators. The assembly includes a plurality of independent supports, each releasably attachable to a levitation electromagnet such that pole faces of the levitation electromagnet oppose a top protruding surface of a levitation rail of the ring and each releasably attachable to a centering electromagnet such that pole faces of the centering electromagnet oppose a surface of the centering rail of the ring. The control system supplies current to each levitation electromagnet to generate vertical forces to levitate and vertically stabilize the ring and to each centering electromagnet to generate radial forces to center and horizontally stabilize the ring. At least two of motor/generators electromagnetically engage a reaction rail of the ring and impose a reversible torque on the ring to enable bi-directional transfer of electrical energy from the energy source to the ring in the form of kinetic energy of rotation of the ring, and subsequent recovery of electrical energy from the kinetic energy of rotation of the ring.

35 Claims, 15 Drawing Sheets

(56) References Cited

U.S. PATENT DOCUMENTS

| | | | | |
|---|---|---|---|---|
| 4,491,769 A * | 1/1985 | Heidelberg | H02K 29/08 | 310/102 R |
| 4,509,006 A * | 4/1985 | Pinson | H02K 7/025 | 310/113 |
| 5,390,554 A * | 2/1995 | Silvent | B64G 1/28 | 310/90 |
| 5,432,382 A * | 7/1995 | Pawlowski | H02K 33/00 | 290/1 R |
| 5,514,923 A * | 5/1996 | Gossler | H02J 7/14 | 310/113 |
| 5,789,837 A * | 8/1998 | Shin | F16C 32/0438 | 310/114 |
| 5,818,137 A | 10/1998 | Nichols et al. | | |
| 5,969,446 A * | 10/1999 | Eisenhaure | F16F 15/1428 | 310/51 |
| 6,867,520 B2 | 3/2005 | Jennings | | |
| 6,873,235 B2 | 3/2005 | Fiske et al. | | |
| 7,009,310 B2 * | 3/2006 | Cheung | B60C 23/041 | 290/1 R |
| 7,151,322 B2 * | 12/2006 | Eskandr | F03G 1/02 | 290/1 R |
| 7,564,153 B2 * | 7/2009 | Ucer | H02K 53/00 | 310/80 |
| 7,855,478 B2 * | 12/2010 | Wandzilak | H02K 49/10 | 310/20 |
| 7,902,703 B2 * | 3/2011 | Ucer | H01L 37/04 | 310/80 |
| 9,624,900 B2 * | 4/2017 | Phillips | F03B 13/16 | |
| 2003/0192449 A1 | 10/2003 | Fiske et al. | | |
| 2011/0158382 A1 | 6/2011 | Sahin Nomaler et al. | | |
| 2011/0215592 A1 | 9/2011 | Ishikawa et al. | | |
| 2012/0062154 A1 * | 3/2012 | Chiao | H02K 3/47 | 318/161 |
| 2015/0060163 A1 * | 3/2015 | Kim | H02K 7/025 | 180/65.8 |
| 2015/0200578 A1 * | 7/2015 | Veltri | H02K 7/025 | 310/74 |

* cited by examiner

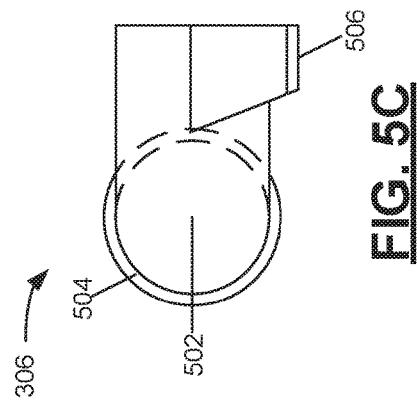
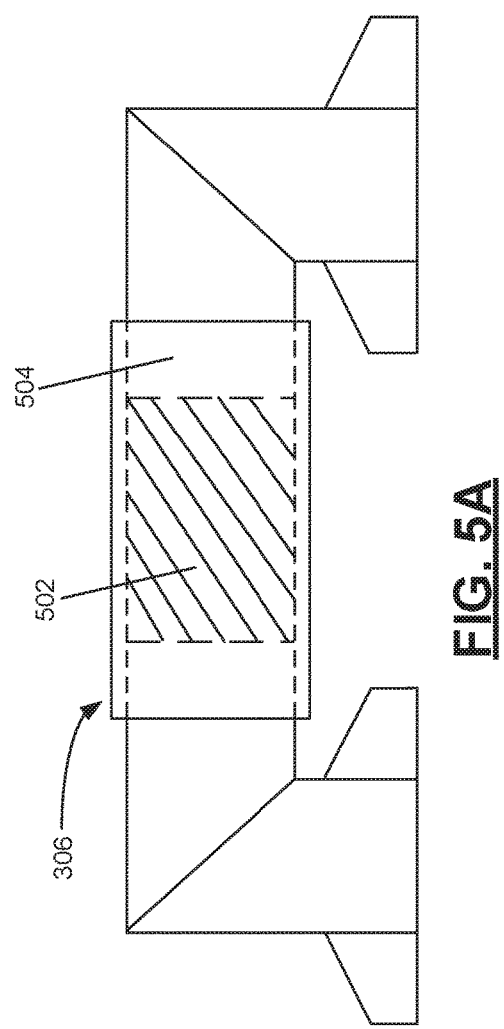
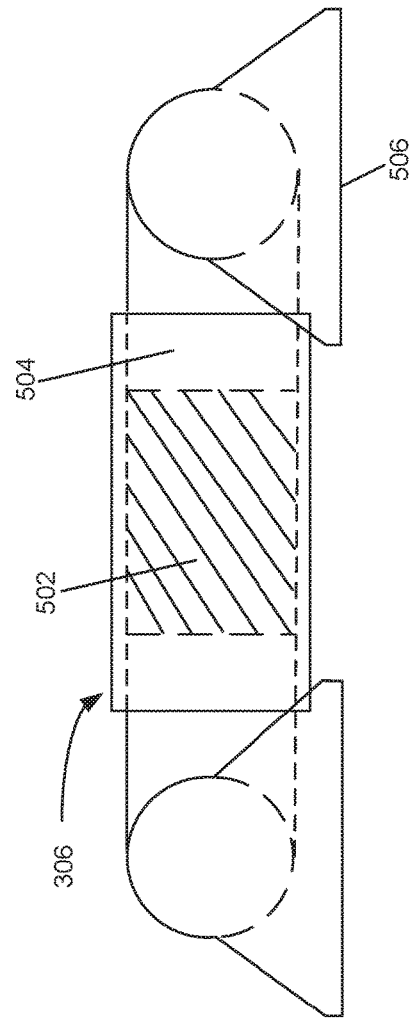

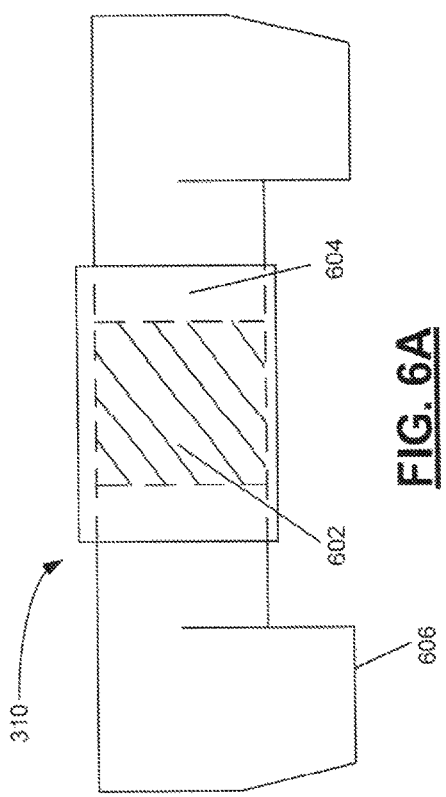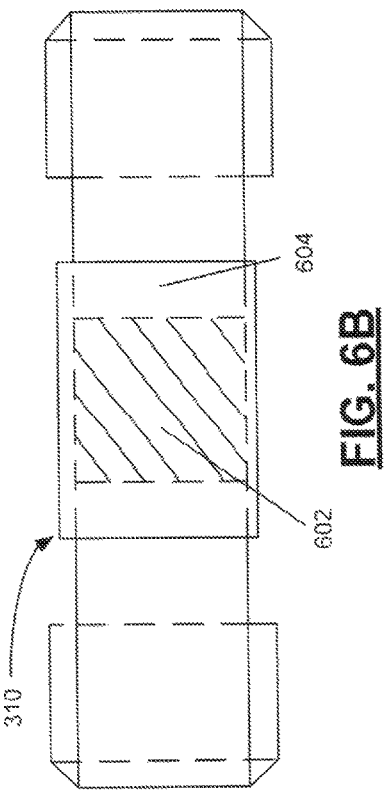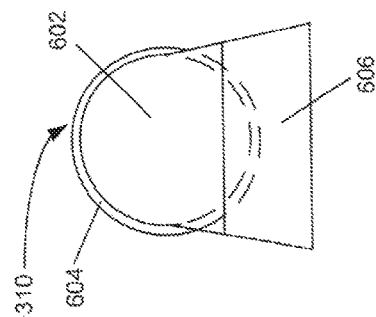

ENERGY STORAGE APPARATUS FOR STORING ELECTRICAL ENERGY GENERATED BY AN ENERGY SOURCE

FIELD OF THE INVENTION

The present disclosure relates to an energy storage apparatus for storing electrical energy generated by external sources, including intermittent renewable energy sources.

BACKGROUND

Over the years, several different technologies have been developed for storing electrical energy generated by renewable energy sources, such as lithium ion batteries, ultra capacitors, and flywheels. One technology is described in U.S. Pat. No. 6,873,235 which describes a levitated ring energy storage device for storing electrical energy generated by a renewable energy source. The energy storage ring described in U.S. Pat. No. 6,873,235 is levitated by a magnetic shear force derived from Haibach arrays of permanent magnets bonded to the inner periphery of the rotating ring which couple to similar Haibach arrays of permanent magnets bonded to the outer periphery of a stationary, concentric cylindrical support structure, separated from the rotating ring by a small gap. A limitation of the levitated ring energy storage device described in U.S. Pat. No. 6,873,235 is that the magnetic levitation shear force, provided by permanent magnets, is uncontrollable and cannot be turned off. Once the levitated ring energy storage device has been assembled, very large externally applied forces are necessary to separate the energy storage ring from the surrounding stationary cylindrical support structure, which makes repairing and maintaining of the levitated ring energy storage device very difficult.

SUMMARY

According to the one aspect of an embodiment, an energy storage system includes an energy storage ring for storing kinetic energy of rotation, the energy storage ring comprising a non-magnetic, high permeability, high electrical resistivity levitation rail protruding from an inner peripheral surface of the energy storage ring, a non-magnetic, high permeability, high electrical resistivity centering rail at the inner peripheral surface of the energy storage ring; and a motor/generator reaction rail at the inner peripheral surface of the energy storage ring. The energy storage system also includes an assembly comprising a plurality of independent supports, each independent support releasably attachable to a levitation electromagnet such that pole faces of the levitation electromagnet oppose a top protruding surface of the levitation rail and releasably attachable to a centering electromagnet such that pole faces of the centering electromagnet oppose a surface of the centering rail; at least two motor/generators; and, a control system coupled to the assembly and each of the at least two motor/generators. The control system is configured to supply current to each levitation electromagnet of the assembly to generate vertical forces to levitate and vertically stabilize the energy storage ring, supply current to each centering electromagnet of the assembly to generate radial forces to center and horizontally stabilize the energy storage ring, and control each of the at least two motor/generators to electromagnetically engage the reaction rail of the energy storage ring and impose a reversible torque on the energy storage ring to enable bi-directional transfer of electrical energy from an energy source external to the energy storage ring into kinetic energy of rotation of the energy storage ring and subsequent recovery of electrical energy from the kinetic energy of rotation of the energy storage ring.

The assembly may include a plurality of touch down bearings, each respective touch down bearing configured to support a portion of the energy storage ring when the control system discontinues supplying current to each levitation electromagnet and each centering electromagnet.

Each respective touch down bearing may be radially movable, and wherein the control system is configured to control each respective touch down bearing to radially move the respective touch down bearing to compensate for variations of a radius of the energy storage ring generated by variations in a rate of rotation of the energy storage ring.

Each respective independent support may be configured to radially move the respective levitation electromagnet and wherein the control system is configured to independently control each independent support to radially move the respective levitation electromagnet to compensate for variations of a radius of the energy storage ring generated by variations in a rate of rotation of the energy storage ring.

Each respective independent support may be configured to radially move the respective centering electromagnet and wherein the control system is configured to control each independent support to radially move the respective centering electromagnet to compensate for variations of a radius of the energy storage ring generated by variations in a rate of rotation of the energy storage ring.

A first independent support of the plurality of independent supports may be configured to releasably attach to a first motor/generator of the at least two motor/generators and a second independent support of the plurality of independent supports may be configured to releasably attach to a second motor/generator of the at least two motor/generators, and wherein the first independent support and the second independent support are diametrically opposed.

The first independent support may be configured to radially move the first motor/generator, wherein the second independent support is configured to radially move the second motor/generator, and the control system may be configured to control the first motor/generator and the second motor/generator to compensate for variations of a radius of the energy storage ring generated by variations in a rate of rotation of the energy storage ring.

The energy storage ring may include a second motor/generator reaction rail. The centering rail of the energy storage ring may be disposed in a horizontal plane extending through a center of mass of the energy storage ring, the reaction rail may be disposed above the plane extending through the center of mass of the energy storage ring and the second reaction rail may be disposed below the plane extending through the center of mass of the energy storage ring.

The energy storage ring further may include a second non-magnetic, high permeability, high resistivity centering rail at the inner peripheral surface of the ring. Each independent support may be releasably attachable to a second centering electromagnet such that pole faces of the second centering electromagnet face oppose the second centering rail, the centering rail may be disposed above a horizontal plane extending through a center of mass of the energy storage ring and the second centering rail may be disposed below the horizontal plane extending through the center of mass of the energy storage ring.

Each of the at least two motor/generators may be a linear synchronous electric motor/generator.

The control system may be further configured to control a variable frequency drive of each respective linear synchronous electric motor/generator for varying a speed and thrust of the respective linear synchronous electric motor/generator according to varying power demands imposed on the energy storage system.

The energy storage system may include an uninterruptable power supply (UPS) configured to locally store electrical energy being transferred from the energy source external to the energy storage ring into kinetic energy of rotation of the energy storage ring and electrical energy being recovered from the kinetic energy of rotation of the energy storage ring and transferred to an external user.

The UPS may be configured to provide electrical power for continuous operation of the control system when the energy storage ring is levitated and rotating.

At least one of the levitation electromagnet and the centering electromagnet may include a permanent magnet core and an electromagnet coil surrounding the permanent magnet core.

The energy storage system may also include a cooling mechanism configured to cool each motor/generator when the energy storage ring is levitated and rotating.

The cooling mechanism may be configured to cool the assembly and the control system when the energy storage ring is levitated and rotating.

The assembly may include three discrete subassemblies arranged around a circumference of the energy storage ring with each respective discrete subassembly spaced equidistant from adjacent discrete assemblies, and each respective discrete subassembly comprising one of the independent supports.

The at least two motor/generators may include three motor/generators, and each independent support may be releasably attachable to one of the three motor/generators.

The assembly may include a plurality of discrete subassemblies arranged around a circumference of the energy storage ring with each respective discrete subassembly including one of the plurality of independent supports.

The at least two motor/generators may include a plurality of motor/generators, and each independent support may be releasably attachable to one of the plurality of motor/generators.

The plurality of discrete subassemblies may be arranged in pairs around the circumference of the energy storage ring, and each pair of discrete subassemblies may include a first discrete subassembly and a second discrete subassembly diametrically opposed the first discrete subassembly.

The at least two motor/generators may include a first motor/generator and a second motor/generator, the independent support of the first discrete subassembly of one of the pairs of discrete subassemblies may be releasably attachable to the first motor/generator, and the independent support of the second discrete subassembly of the one of the pairs of discrete subassemblies may be releasably attachable to the second motor/generator.

The at least two motor/generators may include a plurality of motor/generators and the independent support of each discrete subassembly of each pair of discrete subassemblies may be releasably attachable to one of the plurality of motor/generators.

Each discrete subassembly may include a touch down bearing configured to support a portion of the energy storage ring when the control system discontinues supplying current to each levitation electromagnet.

The control system may be configured to independently control each respective discrete subassembly to vertically displace the touch down bearing from a first position in which the touch down bearing is located directly beneath the energy storage ring and separated from the energy storage ring, to a second position in which the touch down bearing is located directly beneath the energy storage ring and in contact with the energy storage ring to bear a weight of the energy storage ring.

Each respective discrete subassembly may include a radial compensator module coupled to each respective discrete subassembly, each respective radial compensator module may include a radial actuator for displacing the respective discrete subassembly radially to compensate for variations in a radius of the energy storage ring generated by variations in a rate of rotation of the energy storage ring.

The control system may be configured to control each respective radial compensator module.

The energy storage system may also include a plurality of first air gap sensors disposed on the centering electromagnet, each first air gap sensor configured to measure a width of an air gap between pole faces of each respective centering electromagnet and the surface of the centering rail.

The energy storage system may also include a plurality of second air gap sensors disposed on the levitation electromagnet, each second air gap sensor configured to measure a width of an air gap between pole faces of each respective levitation electromagnet and the top protruding surface of the levitation rail.

The control system may be configured to process first data received from each first air gap sensor to control the current supplied to each centering electromagnet and to control each respective radial compensator module to maintain a constant measure in the width of the first air gap between pole faces of each respective centering electromagnet and the surface of the centering rail.

The control system may also be configured to process second data received from each second air gap sensor and to control the current supplied to each levitation electromagnet to maintain a constant measure in the width of the second air gap between pole faces of each respective levitation electromagnet and the top protruding surface of the levitation rail.

The energy storage system may also include a containment structure configured to house the energy storage ring, the containment structure having an internal air pressure that reduce aerodynamic drag of the energy storage ring when the energy storage ring is rotating.

The containment structure may be circular and may have a rectangular cross-section.

The containment structure may include a roof having at least one access port, each of the at least one access ports for accessing an energy storage ring service area in an interior of the containment structure which is located between adjacent discrete subassemblies.

The containment structure may be configured to house a gantry system for transporting replacement components for each respective subassembly.

BRIEF DESCRIPTION OF THE DRAWINGS

Embodiments of the present invention will be described, by way of example, with reference to the drawings and to the following description, in which:

FIG. 5A, FIG. 5B, and FIG. 5C are: a top view, a side view, and an end view, respectively, of a levitation electromagnet of the subassembly of FIG. 4;

FIG. 6A, FIG. 6B, and FIG. 6C are: a side view, a top view, and an end view, respectively, of the upper centering electromagnet of the subassembly of FIG. 4;

DETAILED DESCRIPTION OF THE PREFERRED EMBODIMENTS

Figure 1:
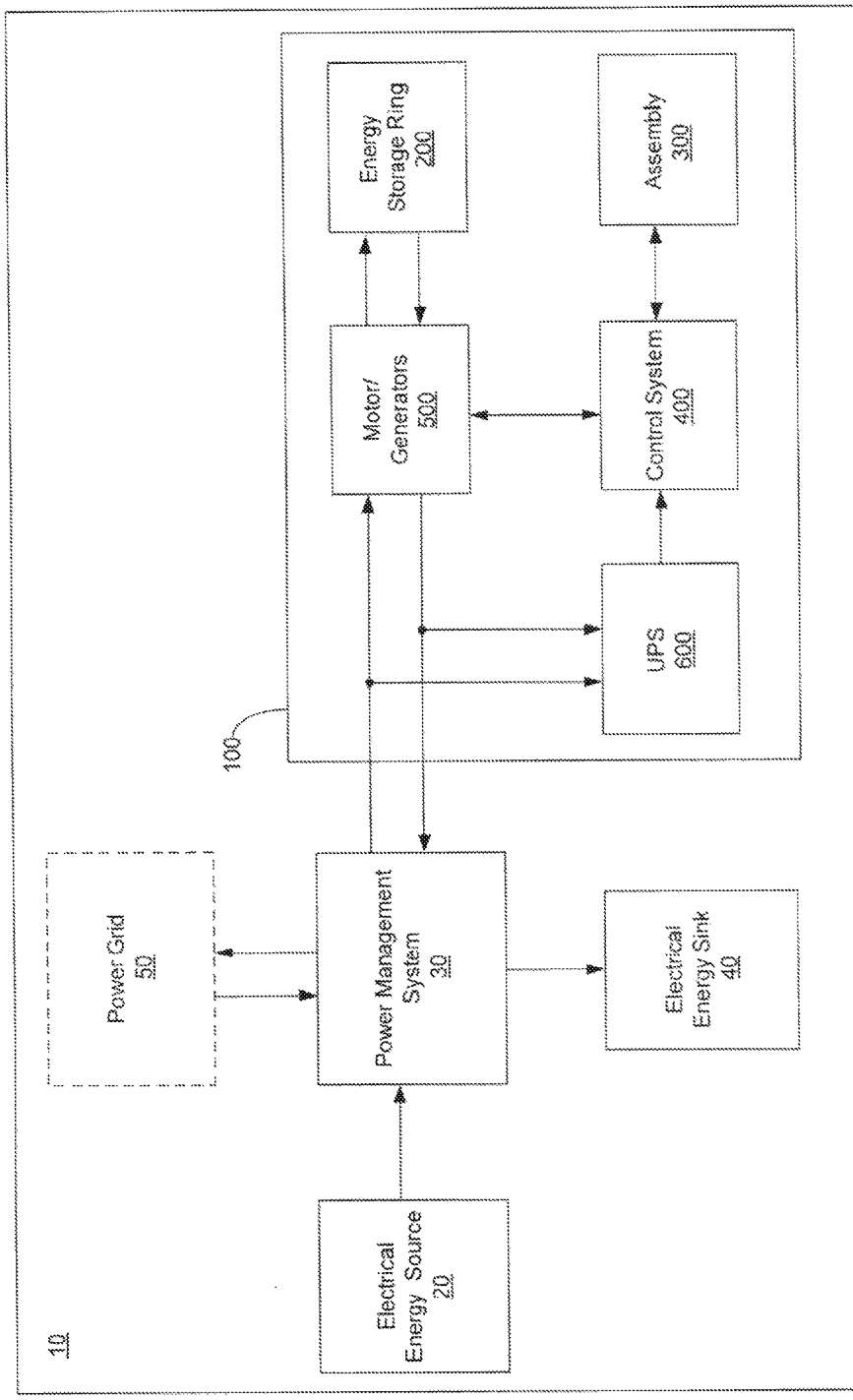
FIG. 1 is a block diagram of a system for generating, storing, and delivering electrical energy in accordance with an embodiment.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an energy storage system for storing electric energy generated by an energy source, such as for example, an intermittent renewable energy source. Examples of intermittent renewable energy sources include photo-voltaic solar arrays, wind turbines, tidal energy generators, and the like.

FIG. 1 depicts a block diagram of an example embodiment of a system for generating, storing, and delivering electrical energy (hereinafter referred to as system 10). System 10 includes an electrical energy source 20 (hereinafter referred to as source 20) for generating electrical energy, a power management system 30, an electrical energy sink 40 (hereinafter referred to as sink 40), and an energy storage apparatus 100 for storing electrical energy generated by the source 20. The source 20 is connected to the power management system 30 for providing electrical energy to the power management system 30. Power management system 30 is connected to the sink 40 to provide electrical energy generated by the source 20 to the sink 40. The power management system 30 is also connected bi-directionally to the energy storage apparatus 100 to receive electrical energy from the energy storage apparatus 100 and to transfer electrical energy received from the source 20 to the energy storage apparatus 100 as described in further detail below. Optionally, the power management system 30 is connected bi-directionally to power grid 50 to receive electrical energy therefrom and to provide electrical energy thereto. The power management system 30 may also provide electrical energy from the grid 50 to the sink 40.

In the example embodiment shown in FIG. 1, the source 20 is an intermittent renewable energy source, however, in alternative embodiments the source 20 may be any suitable electrical energy source. The energy storage apparatus 100 includes an energy storage ring 200, an assembly 300, a control system 400, and at least two motor/generators 500. The control system 400 is connected to both the assembly 300 and the motor/generators 500 to control the assembly 300 and the motor/generators 500. Optionally, the energy storage apparatus 100 includes an uninterruptable power supply (UPS) 600 connected to the power management system 30 and to the at least two motor/generators 500 to receive electrical energy from the power management system 30 and/or the at least two motor/generators 500 during operation of the energy storage apparatus 100 as described in further detail below.

Figure 2:
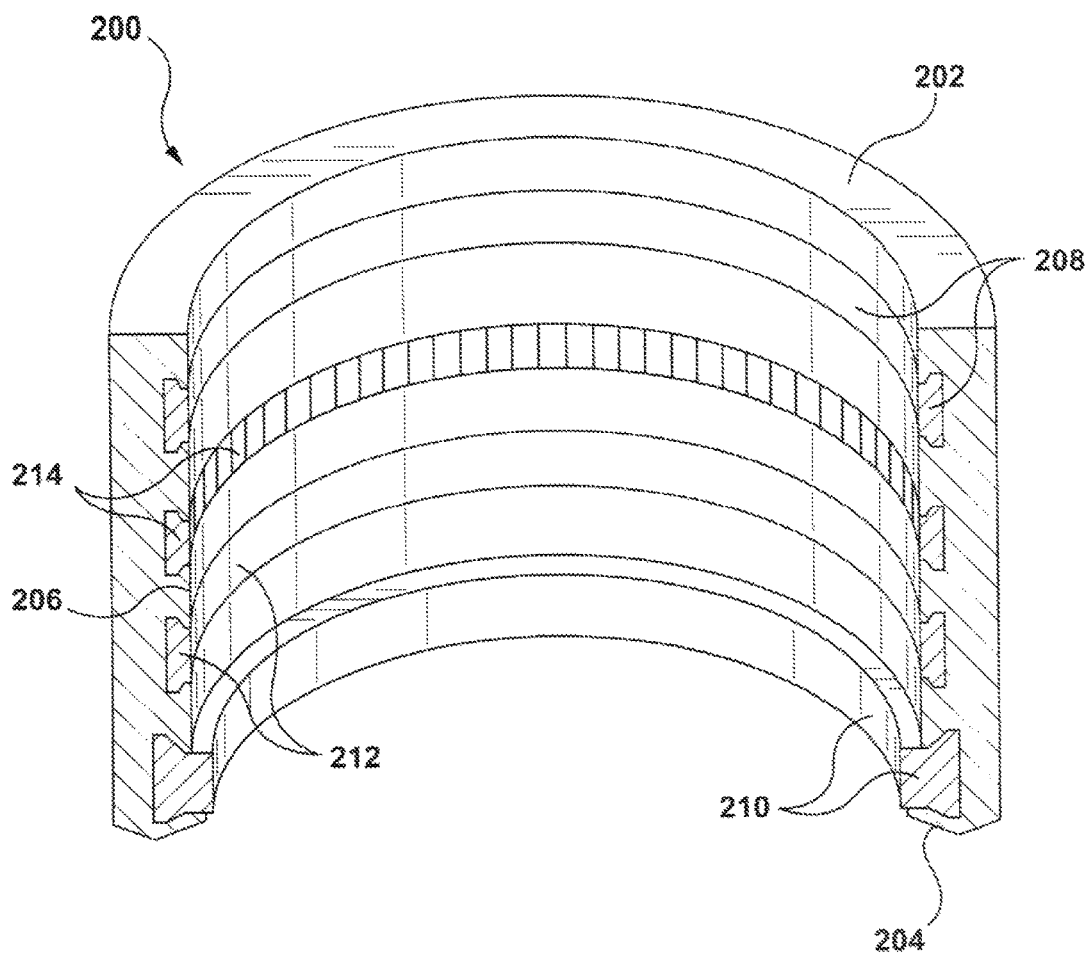
FIG. 2 is a cross-sectional view of an energy storage ring of the energy storage apparatus of the system of FIG. 1 in accordance with an embodiment.

Referring to FIG. 2, a cross-sectional view of an embodiment of the ring 200 of the energy storage apparatus 100 of the system 10 of FIG. 1 is shown. The ring 200 includes a top 202, a bottom 204, and an inner peripheral surface 206. The ring 200 also includes an upper centering rail 208 disposed near the top 202 of the ring 200, a levitation rail 210 disposed near the bottom 204 of the ring 200, a lower centering rail 212 disposed between the upper centering rail 208 and the levitation rail 210, and a motor/generator reaction rail 214 (hereinafter referred to as reaction rail 214) disposed between the upper centering rail 208 and the lower centering rail 212. The upper centering rail 208, the levitation rail 210, and the lower centering rail 212 are each continuous around the inner peripheral surface 206 of the ring 200. The reaction rail 214 includes regularly spaced permanent magnets separated by blocks of low relative permeability material and is also continuous around the inner peripheral surface 206 of the ring 200. The upper centering rail 208, the levitation rail 210, and the lower centering rail 212 and the reaction rail 214 are each, respectively securely attached to the inner periphery of the ring 200 by, for example, embedded dovetailed slots on the inner peripheral surface 206 of the ring 200.

The ring 200 is constructed of high tensile strength, low density material. The upper centering rail 208, the levitation rail 210, and the lower centering rail 212, are each constructed of a non-magnetic material having high relative magnetic permeability and high electrical resistivity. For the purposes of the present disclosure, a high tensile strength, low density material is a material with a tensile strength typically exceeding 1000 MPa and a density typically less than 4 grams per cubic centimeter. Examples of high tensile strength, low density materials include carbon fiber composite, E-glass fiber composite, and Kevlar. For the purposes of the present disclosure, a non-magnetic material is a material that possesses no permanent magnetization; a high relative magnetic permeability material is a material having a relative magnetic permeability typically greater than 1000; and a high electrical resistivity material is a material with an electrical resistivity typically greater than 50 Ohm Metres. Examples of non-magnetic, high permeability, high electrical resistivity materials are Manganese-Zinc Ferrite and Nickel-Zinc Ferrite. The ring 200 cross section has a high aspect ratio. In other words, a ratio of the ring 200 mean vertical height to the ring 200 mean cross section width is typically larger than 2. The cross section of the ring 200 may be generally rectangular. Alternatively, the cross-section of the ring 200 may not be generally rectangular to optimize dynamical performance of the energy storage apparatus 100, to optimally displace a cross-sectional center of mass 324 (FIG. 4) of the ring 200, and to damp modes of vibration of the ring 200 during operation of the energy storage apparatus 100.

The ring 200 may be constructed at a central fabrication facility and transported to an operation site for installation. Alternatively, when the ring 200 is not suitable for transport, the ring 200 may be constructed "in situ" at the operation site. The ring 200 may be constructed by, for example, "monolithic construction" (e.g. fabricated in a single piece) or by a "layered-segmented" construction method. For example, when the ring 200 is constructed using "monolithic construction" and "in situ" at the operation site, the construction process includes constructing a circular form with inner dimensions equal to the outer dimensions of the ring 200 and placing the circular form on a rotary "mandrel" type, or circular "touch down bearing" type, structure to allow the circular form to be rotated about a vertical axis driven by a suitable mechanical mechanism such as, for example, a circular arrangement of rollers powered by electric motors. The ring 200 may be constructed using any suitable material such as, for example, carbon fiber composite, by inserting carbon fiber material, together with suitable bonding material, such as, for example epoxy, into the circular form as the circular form is rotated until the ring 200 is completed. The completed ring 200 and mandrel are then covered or enclosed by a suitable structure to provide an environment appropriate for any necessary "curing" of the ring 200.

In "monolithic construction", the upper centering rail 208, the levitation rail 210, the lower centering rail 212, and the reaction rail 214, with appropriate dovetailed cross sections, may be attached to an inner wall of the circular form, at suitable locations, and embedded in the ring 200 as construction of the ring 200 proceeds.

Alternatively, "monolithic construction" may proceed without embedding the upper centering rail 208, the levitation rail 210, the lower centering rail 212, and the reaction rail 214 in the ring 200. Following monolithic ring fabrication, the dovetailed slots for the upper centering rail 208, the levitation rail 210, and the lower centering rail 212 and for the reaction rail 214 may be machined or ground into the rotating ring 200 by suitable machine tools as the ring 200 rotates after which a pair of vertical "access slots" are machined on the inner peripheral surface 206 of the ring 200 diametrically opposite each other through which short segments or "slabs" of the rail material, machined to the appropriate rail cross section, may be passed into the rail slot and slid horizontally around the slot, behind the overhanging dovetail, to a proper position in the rail whereupon it is bonded in place. This procedure is repeated with as many cross sectional slabs as required to fill the slot and create the continuous rail. The control rail is secured by the tensile strength of the bond on the bottom of the slot, by the shear strength of the bond on the sides of the slot, and by the shear strength of the overhanging dovetail of the ring material. Ring material is then bonded in place in the two "access slots" to complete the operation.

In "monolithic ring construction" the reaction rail 214 proceeds in a similar manner except the reaction rail 214 consists of regularly spaced permanent magnets separated by blocks of low relative magnetic permeability material. The reaction rail 214 dovetailed slots are populated with alternate sections of permanent magnet material alternating with low relative permeability material until the slot is filled and the access slots covered.

The "layered-segmented" method of construction of the ring 200 proceeds, for example, by stacking $N_{layer}$ layers of $M_{seg}$ planar arc segments of the ring 200 with dovetailed interlocks at each end of the segment. The segments of each layer (with the exception of the bottom layer) have interlocking "pegs" protruding from an underside of the segment which penetrate corresponding "holes" in the top of the segment below. The circular arrangement of dovetailed interlocked segments is shifted in azimuth relative to the layer below by the angle $(2*\pi)/(N_{layer}*M_{seg})$ radians. This shifting in azimuth between ring 200 layers ensures that any vertical cross section through the ring 200 contains no more than one dovetailed layer joint. Suitable bonding material is applied to all surfaces.

As in the case of "monolithic construction", the upper centering rail 208, the levitation rail 210, and the lower centering rail 212 are circular and constructed from a material with high relative magnetic permeability and high electrical resistivity. Each of the upper centering rail 208, the levitation rail 210, and the lower centering rail 212 is fabricated with the appropriate cross section in a sequence of arc segments which, placed end to end, constitute the entire circular rail. The layers that make up the ring 200 are designed to leave room for the upper centering rail 208, the levitation rail 210, and the lower centering rail 212 as they are stacked. The lower layer which forms the bottom of the dovetailed slot has machined grooves to support the segments of the upper centering rail 208, the levitation rail 210, and the lower centering rail 212 as they are dropped in place behind the lower dovetail overhang and bonded. Subsequent layers are added and bonded to the control rail segments and to the layers below until the layer forming the top of the dovetailed slot is reached. This top layer also has machined grooves and a dovetail overhang to accommodate the rail and is dropped in placed and bonded, locking the control rail in place. The reaction rail 214 for the motor/generators is constructed by the same method.

Figure 3:
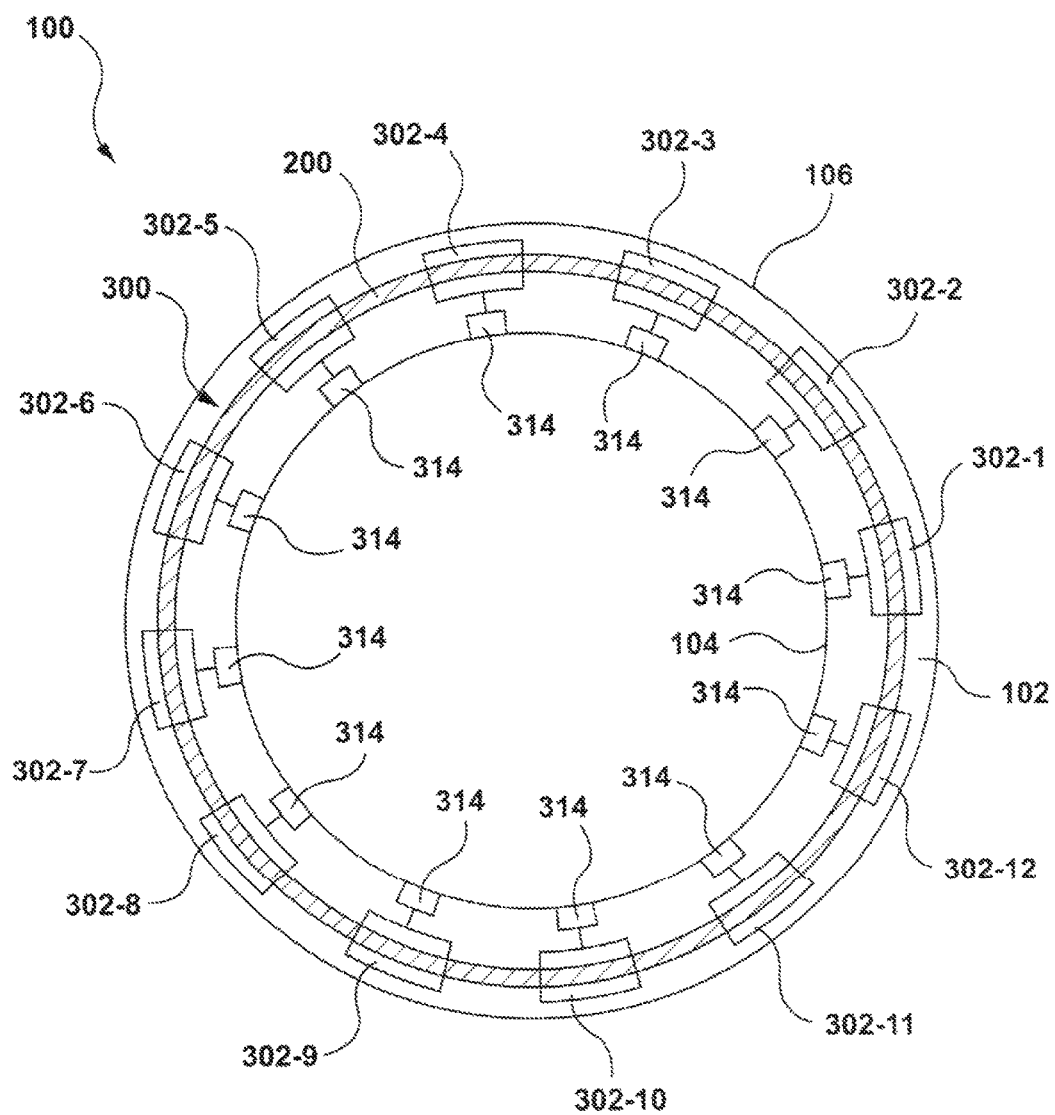
FIG. 3 is a top view of the energy storage apparatus of the system of FIG. 1.

Referring to FIG. 3, a top view of an example embodiment of the energy storage apparatus 100 of FIG. 1 is shown. The energy storage apparatus 100 includes a containment structure 102 that includes an inner wall 104 and an outer wall 106 and is configured to house the ring 200 between the inner and outer walls 104, 106. In the embodiment depicted in FIG. 3, the containment structure 200 has a generally circular shape with a generally rectangular cross section. The containment structure 102 may have an internal air pressure of, for example, 1%-5% Atm, to reduce aerodynamic drag of the ring 200 when the ring 200 is rotating. It will be appreciated that although the containment structure 102 shown in FIG. 3 is generally circular, other suitably shaped containment structures that are configured to house the ring 200 therein are within the scope of the present invention.

The energy storage apparatus 100 also includes the assembly 300. In the embodiment shown, the assembly 300 includes twelve discrete subassemblies 302-1, 302-2, 302-3, 302-4, 302-5, 302-6, 302-7, 302-8, 302-9, 302-10, 302-11, 302-12 (referred to hereinafter individually as subassembly 302 and collectively as subassemblies 302) arranged around a circumference of the ring 200 and occupying approximately fifty percent of the ring 200. Each discrete subassembly 302 includes an independent support 304 (FIG. 4) configured to releasably attach to a levitation electromagnet 306 (FIG. 4) such that pole faces 506 (FIG. 5) of the levitation electromagnet 306 oppose a top protruding surface 308 (FIG. 4) of the levitation rail 210. The independent support 304 of each subassembly 302 is also configured to releasably attach to an upper centering electromagnet 310 (FIG. 4) such that pole faces 606 (FIG. 6) of the upper centering electromagnet 310 oppose a surface of the upper centering rail 208 and releasably attach to a lower centering electromagnet 312 such that pole faces 706 (FIG. 7) of the lower centering electromagnet 312 oppose a surface of the lower centering rail 212. Each discrete subassembly 302 also includes a radial compensator module 314 coupled to each respective discrete subassembly 302 for displacing the independent support 304 of the discrete subassembly 302 radially to compensate for variations in a radius of the ring 200 generated by variations in a rate of rotation of the ring 200.

Although the assembly 300 shown in the embodiment of FIG. 3 includes twelve discrete subassemblies 302, in alternative embodiments, the assembly 300 may include any suitable number of pairs of discrete subassemblies 302 arranged around the circumference of the ring 200, with a first discrete subassembly 302 of each respective pair of discrete subassemblies 302 being diametrically opposed from a second discrete subassembly 302 of the respective pair of discrete subassemblies 302. In this embodiment, the assembly 300 comprises a set of motor/generators 500, with the independent support 304 of each discrete subassembly configured to be releasably attachable to one of the motor/generators of the set of motor/generators.

In still another alternative embodiment, the assembly 300 may include three independent subassemblies 302 arranged around the circumference of the ring 200 with each respective discrete subassembly 302 spaced equidistant from adjacent discrete assemblies 302. In other words, each respective discrete subassembly 302 is angularly spaced by 120 degrees from an adjacent discrete subassembly 302. In this embodiment, the energy storage system includes three motor/generators 500. Each of the three discrete subassemblies includes an independent support 304 that is configured to releasably attach to one of the three motor/generators 500.

In still another embodiment, the assembly 300 may be a continuous structure that includes a plurality of independent supports. In this embodiment, each independent support is configured to releasably attach to a levitation electromagnet such that pole faces of the levitation electromagnet oppose a top protruding surface of the levitation rail 210 and releasably attach to a centering electromagnet such that pole faces of the centering electromagnet oppose a surface of the centering rail of the ring 200. Each independent support may also be configured to releasably attach to one of the motor/generators 500. For example, each individual support may include a first mechanical support that releasably attaches to the levitation electromagnet 306 and radially moves the levitation electromagnet 306, and second mechanical support that releasably attaches to the upper centering electromagnet 310 and radially moves the upper centering electromagnet 310, and a third mechanical support that releasably attaches to the lower centering electromagnet 312 and radially moves the lower centering electromagnet 312. Each individual support may also include a fourth mechanical support that releasably attaches to one of the motor/generators 500 and radially moves the one motor/generator. In this embodiment, the control system 400 may independently control each of the first, second, third and fourth mechanical supports to radially move the levitation electromagnet 306, the upper centering magnet 310, the lower centering electromagnetic 312, and/or the one motor/generator 500 to compensate for variations of the radius of the ring 200 generated by variations in the rate of rotation of ring 200 during operation of the energy storage apparatus 100.

In still other alternative embodiments, some of the discrete subassemblies 302 may include a motor/generator 500. The total number of motor/generators 500 in any given implementation of the present invention may be determined by the required power input/output of the energy storage ring apparatus 100 and the thrust specification of the motor/generator 500 used in the electrical storage apparatus 100. The electrical energy power output (while ring 200 is discharging) as well as the kinetic energy power input (while ring 200 is charging) of each motor/generator 500 is the product of the motor thrust and the tangential speed of the reaction rail of the ring. This product, summed over all the motor/generators 500, must match or exceed the power output/input requirements of the ring 200. This will provide the total number of motor/generators 500 required for any given implementation of the energy storage apparatus 100.

Referring again to FIG. 1, the control system 400 of the energy storage apparatus 100 is configured to supply current to each levitation electromagnet 306 (FIG. 4) of the assembly to generate vertical forces to levitate and vertically stabilize the ring 200, and to supply current to each upper centering electromagnet 310 (FIG. 4) and each lower centering electromagnet 312 (FIG. 4) of the assembly 300 to generate radial forces to center and horizontally stabilize the ring 200. The control system 400 may also control a variable frequency drive of the motor/generators 500 to vary a speed and thrust of the motor/generators 500 according to varying power demands imposed on the system 100. The control system (not shown) includes a control computer 804 (FIG. 8 and FIG. 10) that may be mounted in an equipment rack (not shown). The equipment rack may be disposed within the containment structure 102. Alternatively, the equipment rack may be placed outside the containment structure 102.

The at least two motor/generators 500 of the energy storage apparatus 100 are configured to electromagnetically engage the reaction rail 214 of the ring 200 and impose a reversible torque on the ring 200 to enable bi-directional transfer of electrical energy from the source 20 into kinetic energy of rotation of the ring 200 and subsequent recovery of electrical energy from the kinetic energy of rotation of the ring 200. In the example embodiment shown in FIGS. 1, 2, and 3, the at least two motor/generators 500 are linear synchronous motor/generators. It will be appreciated, however, that in alternative embodiments, the at least two motor/generators 500 may be any suitable type of motor/generator.

Figure 4:
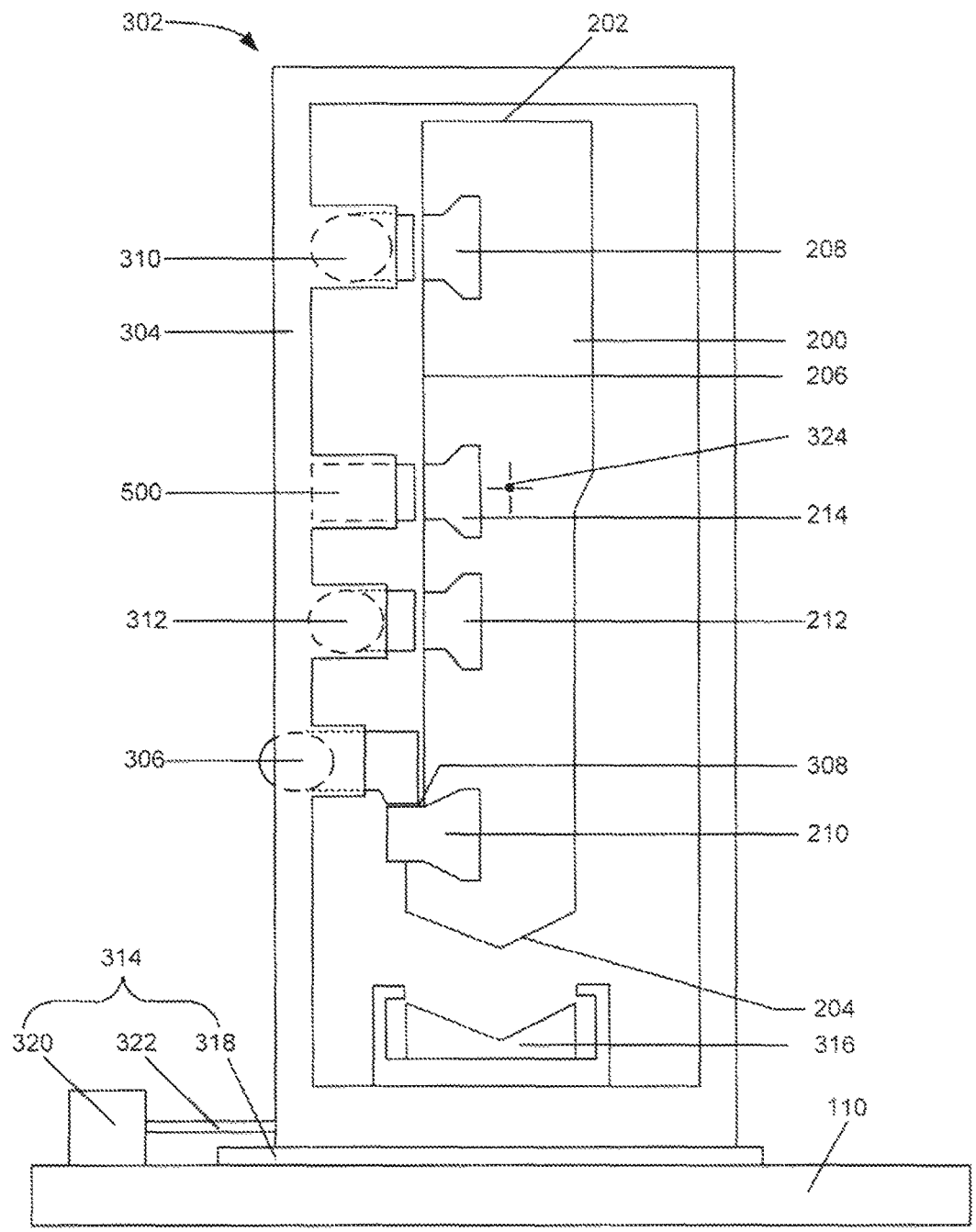
FIG. 4 is a side view of a subassembly the energy storage apparatus of FIG. 3.

Referring now to FIG. 4, a side view of an example embodiment of one of the discrete subassemblies 302 of the energy storage apparatus 100 is shown. It will be appreciated that each discrete subassembly 302 has the same structure as the subassembly 302 shown in FIG. 4. As mentioned above, in the example embodiment depicted, the discrete subassembly 302 includes an independent support 304 that surrounds a portion of the ring 200. The Independent support 304 is configured to releasably attach to the levitation electromagnet 306 such that pole faces 506 (FIG. 5) of the levitation electromagnet 306 oppose a top protruding surface 308 of the levitation rail 210. The independent support 304 is also configured to releasably attach to a lower centering electromagnet 312 such that pole faces 706 (FIG. 7) of the lower centering electromagnet 312 oppose a surface of the lower centering rail 212. Each discrete subassembly 302 also includes a radial compensator module 314 coupled to each respective discrete subassembly 302 for displacing the discrete subassembly 302 radially to compensate for variations in a radius of the ring 200 generated by variations in a rate of rotation of the ring 200. The radial compensator module 314 includes radial compensator rails 318 mounted on a floor 110 of the containment structure 102, and a radial compensator controller 320 attached to the independent support 304 via a radial compensator actuator 322. The discrete subassembly 302 also includes a touchdown bearing 316. The touchdown bearing 316 may be raised using a vertical displacement mechanism, such as for example, hydraulic scissor jacks or hydraulic rams, to support the ring 200 when the ring 200 is not levitated and rotating.

The operation of the energy storage apparatus 100 will now be described with reference to FIG. 1 to 4. The ring 200 is supported by the levitation electromagnet 306, the upper centering electromagnet 310 and the lower centering electromagnet 312 and stores energy in the form of kinetic energy of rotation. While "charging", electrical energy is transferred from source 20 to kinetic energy of the rotating ring 200 by positive torques imposed on the ring 200 by the linear motor/generators 500, acting as motors, which engage the reaction rail 214 on the inner peripheral surface 206 of the ring 200. While each individual linear motor/generator 500 engages the reaction rail 214 along a short arc, the entire circumference of the reaction rail 214 may, in principle, be occupied by a large number of discrete linear motor/generators 500 depending on the required power output of the ring 200. While "discharging", kinetic energy of the rotating ring 200 is transferred from the ring 200 and delivered as electrical energy to sink 40 by negative torques imposed on the ring 200 by the linear motor/generators 500 acting as generators.

Referring to FIG. 5A-5C, an embodiment of the levitation electromagnet 306 of the discrete subassembly 302 of FIG. 4 is shown. The levitation electromagnet 306 includes a permanent magnet core 502, an electromagnet coil 504 that wraps around the permanent magnet core 502, and a pole face 506. The pole face 506 of each levitation electromagnet 306 extends horizontally along a circumference of the levitation rail 210 so that all the levitation electromagnets 306 occupy a fraction of the total circumference of the levitation rail 210 to minimize hysteresis and eddy current losses and to reduce vibration in the ring 200. A levitation force generated by each levitation electromagnet 306 is provided by a combination of:

(1) the permanent magnet core 502 of each levitation electromagnet 306 which generates a constant vertical attractive magnetic force, $F_j^{lev-const}$; j=1,2,3, ... $N_{mag}$, acting on the levitation rail 210 which, when summed overall $N_{mag}$ levitation magnets 306, imposes a constant total vertical force acting through the center of mass of the ring 200, located at the ring center, equal to a fraction $1-f_{lev}$ of the weight of the ring 200, where the control system parameter $f_{lev}$ is in the range $0<f_{lev}<1$.

(2) the electromagnet coil 504 of each levitation electromagnet 306 which generates a controlled time variable vertical attractive magnetic force, $F_j^{lev-variable}$; j=1,2,3, ... $N_{mag}$, as determined by the control system, acting on the levitation rail 210. When the forces $F_j^{lev-variable}$; j=1,2,3 ... $N_{mag}$ are summed over all $N_{mag}$ levitation magnets 306 they impose a controlled time variable total vertical force acting through the center of mass of the ring 200, located at the ring center, ranging between a minimum value of 0 to a maximum value of $2f_{lev}$ times the weight of the ring 200, where $f_{lev}$ is a control system parameter in the range $0<f_{lev}<1$. The electromagnet coils 502 also generate increments or decrements to the time veritable attractive forces $F_j^{lev-variable}$; j=1,2,3 ... $N_{mag}$ as determined by the control system to impose appropriate precessional torques on the rotating ring 200 to stabilize and maintain the correct orientation of the plane of rotation of the ring 200. With the control system parameter $f_{lev}$ in tile range $0<f_{lev}<1$, the maximum positive and negative vertical acceleration of the center of mass of the ring 200 is given by $A_{z,max}=f_{lev}*g$, where g=9.81 m/sec² is the acceleration of gravity.

In an alternative embodiment, both the constant and time variable attractive magnetic forces provided by each levitation electromagnet 306 may be generated entirely by the electromagnet coil 504. In both this embodiment as well as the alternative embodiment without a permanent magnet core, control of current flowing through the electromagnet coil 504 of each levitation electromagnet 306 allows the ring 200 to be lowered onto the touchdown bearing 316 to facilitate servicing of the ring 200.

Referring to FIG. 6A-6C, an embodiment of the upper centering electromagnet 310 of the discrete subassembly 302 of FIG. 4 is shown. The upper centering electromagnet 310 includes a permanent magnet core 602, an electromagnetic coil 604 that wraps around the permanent magnet core 602, and a pole face 606.

Figure 7C:
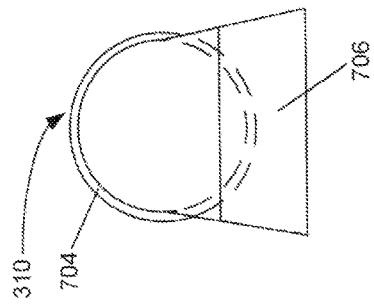
FIG. 7A, FIG. 7B, and FIG. 7C are: a side view, a top view, and an end view, respectively, of the lower centering electromagnet of the subassembly of FIG. 4.
Figure 7A:
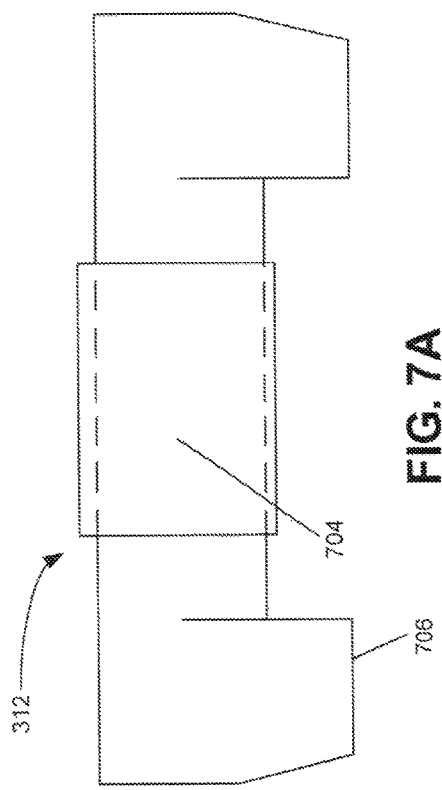
Figure 7B:
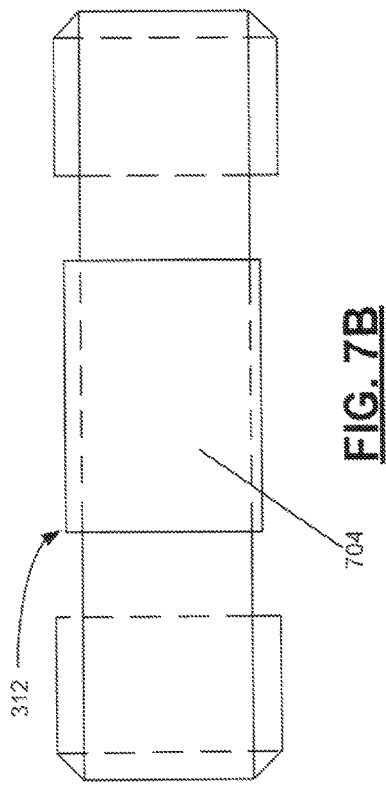

Referring to FIG. 7A-7C, an embodiment of the lower centering electromagnet 312 of the discrete subassemblies 302 of FIG. 3 is shown. The lower centering electromagnet 312 includes an electromagnetic coil 704 and a pole face 706.

As noted above, each discrete subassembly 302 includes the upper and lower centering electromagnets 310, 312 located one above the other. The control system 400 controls current supplied to the upper and lower centering electromagnet coils 604, 704 to control the horizontal location of the center of mass of the ring 200, located at the center of the ring 200, when the ring 200 is rotating. Controlling the center of the rotating ring 200 is accomplished by time dependent, attractive magnetic centripetal forces, $F_{upper,j}^{cent-variable}$ and $F_{lower,j}^{cent-variable}$ acting on the upper centering rail 208 and the lower centering rail 212, respectively generated by energizing the electromagnetic coils 604, 704 of the upper and lower centering electromagnets 310, 312 respectively using the control system 400.

The upper and lower centering electromagnets 310, 312 rely on only attractive magnetic forces for their operation, consequently only those upper and lower centering electromagnets 310, 312 whose position vectors have a component in the direction of the displacement vector $\vec{W}$, the horizontal displacement from the origin of the ring 200 centre of mass, located at the center of the ring 200 (FIG. 11), are energized in order to null out the horizontal displacement of the ring 200. The upper and lower centering electromagnets 310, 312, located at azimuths $\phi_k$, k=1, 2, . . . , $$\frac{N_{mag}}{2},$$

whose position vectors have a component in the direction of the displacement vector $\vec{W}$, the displaced center of mass of the ring 200, located at the center of the ring 200, are referred to as the "active centering set" of upper and lower centering electromagnets.

The "active centering set" generates a net, time dependent centripetal force $F^{cent-variable}$ whose azimuth and magnitude is determined by the control system 400 and given by the magnitude of the vector sum over the individual time dependent centripetal forces of the "active centering set". The force $F^{cent-variable}$ is directly opposed to the direction of the displacement vector $\vec{W}$ (FIG. 11) of the displaced center of mass of the ring 200, located at the ring center, and nulls out the displacement of the center of mass of the ring 200. The magnitude of the $F^{cent-variable}$ ranges from a minimum of zero to a maximum sufficient to impart a maximum horizontal acceleration of the center of mass of the ring 200, located at the ring center, equal to $A_{cent:max} = f_{cent} \cdot g$ where the control system 400 parameter $f_{cent}$ lies in the range $0 \leq f_{cent} \leq 1$ and g=9:81 m/sec² is the acceleration of gravity.

For each member of the active centering set located at azimuth $\phi_k$ the magnitude of the forces $F_{upper,k}^{cent-variable}$, where k=1, . . ., $$\frac{N_{mag}}{2},$$

acting on the upper centering rail 208 and $F_{lower,k}^{cent-variable}$, where k=1, . . . , $$\frac{N_{mag}}{2},$$

acting on the lower centering rail 212, are proportioned to minimize any local torque about the ring 200 cross section center of mass 324 to ensure that the attractive centripetal forces generated by the "active centering set" serve only to translate the center of mass of the ring 200, located at the ring center, and not rotate the ring 200 about the x-axis or the y-axis.

In addition to providing a centering acceleration force to control the horizontal position of the center of mass of the ring 200, located at the ring center, every upper centering electromagnet 310 provides constant and time variable attractive magnetic forces acting on the upper centering rail 208 to oppose the local, constant and time variable, torques about the ring 200 cross section center of mass 324 in order to relieve the hoop stress arising in the ring 200 generated by the local, constant and time variable, vertical levitation forces of each levitation electromagnet 306.

In an alternative embodiment, both the constant and time variable attractive magnetic forces provided by each centering magnet 310 may be generated by the respective electromagnet coils.

Figure 8:
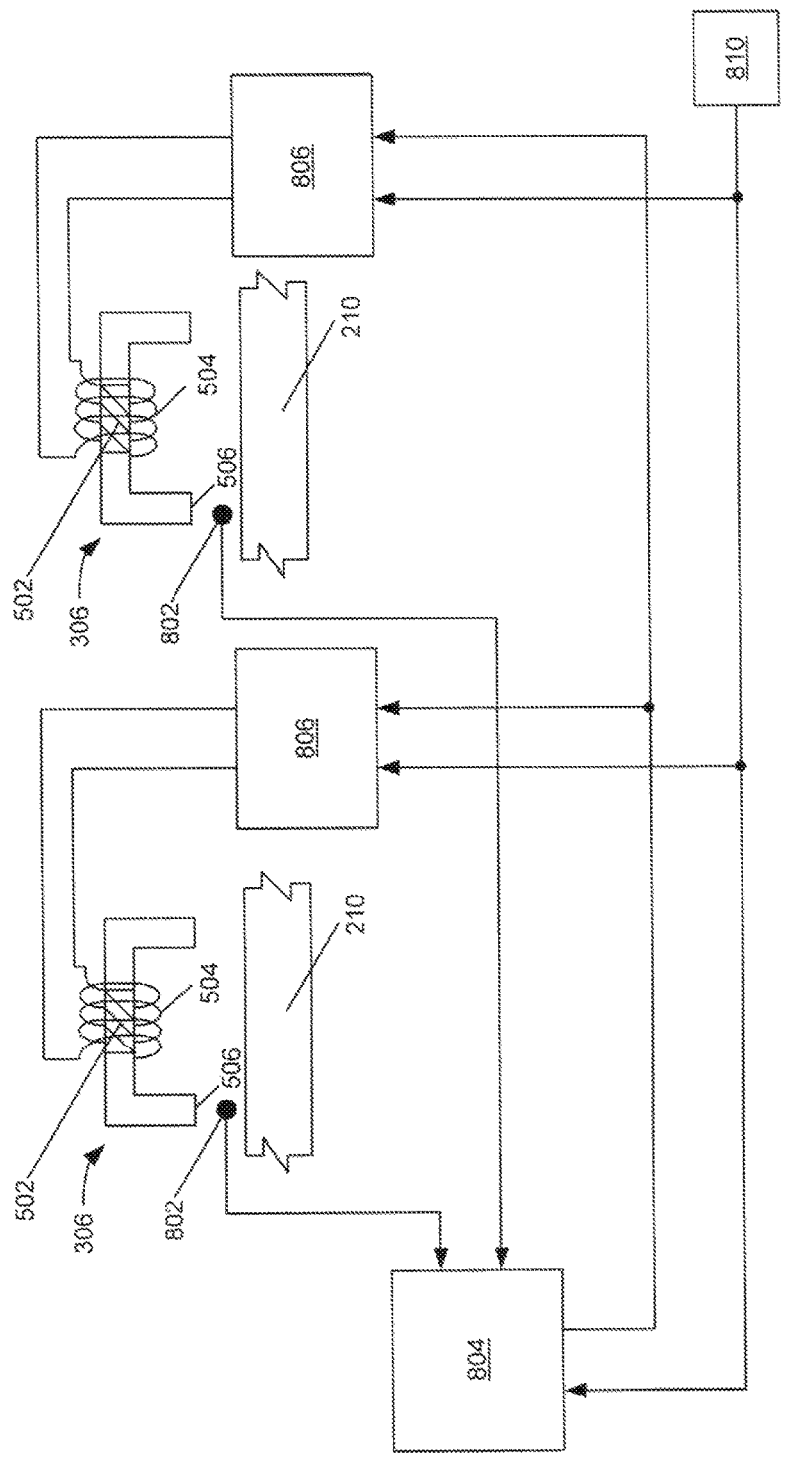
FIG. 8 is a block diagram depicting a portion of the control system of the energy storage apparatus of FIG. 1 for controlling vertical displacement of the energy storage ring of FIG. 1.

Referring to FIG. 8, a block diagram illustrating a portion of the control system 400 for controlling the vertical displacement of the ring 200 is shown. In FIG. 8, the levitation electromagnet 306 of each discrete subassembly 302 engages the levitation rail 210. An air gap sensor 802 is disposed on the pole face 506 of each respective levitation electromagnet 306 to measure an air gap between the pole face 506 of the respective levitation electromagnet 306 and the top protruding surface 308 of the levitation rail 210 at kilo-Hertz rates. A control computer 804 of the control system 400 receives the air gap measurement data from each respective air gap sensor 802 and determines an increment or a decrement to the current supplied to the electromagnet coil 504 of each respective levitation electromagnet 306 to null out the levitation control system error signal parameters including the vertical, z-displacement of the centre of mass of the ring 200, located at the center of the ring 200, and the two orientation Euler angles, $\theta$ and $\phi$, specifying the inclination of a plane of rotation of the ring 200. The control computer 804 controls a DC power amplifier controller 806 connected to each respective levitation electromagnet 306 to change the current supplied to the electromagnet coils 504 of the respective levitation electromagnet 306. AC power is supplied to each respective DC power amplifier controller 806 from an AC power source 810. Nulling out the error signal parameters associated with the Euler angles $\theta$ and $\phi$ requires the imposition of precessional torques on the rotating ring 200 by the electromagnet coils 504 of each respective levitation electromagnet 306.

The azimuth angle $\phi$ becomes indeterminate, and may be assumed to be zero, once the inclination angle $\theta$ has been nulled out. The inclination angle $\theta$ is nulled out by controlling each respective levitation electromagnet 306 to impose differential vertical forces across a non-rotating diameter, at the line of nodes (FIG. 9) at azimuth angle $\phi$ of the rotating ring 200, selected that so that the imposed forces give rise to a torque on the angular momentum vector $\vec{L}$ of the rotating ring 200 that precesses the angular momentum vector so that it will be brought into coincidence with the z-axis of a local coordinate system corresponding to the vertical direction.

Figure 9:
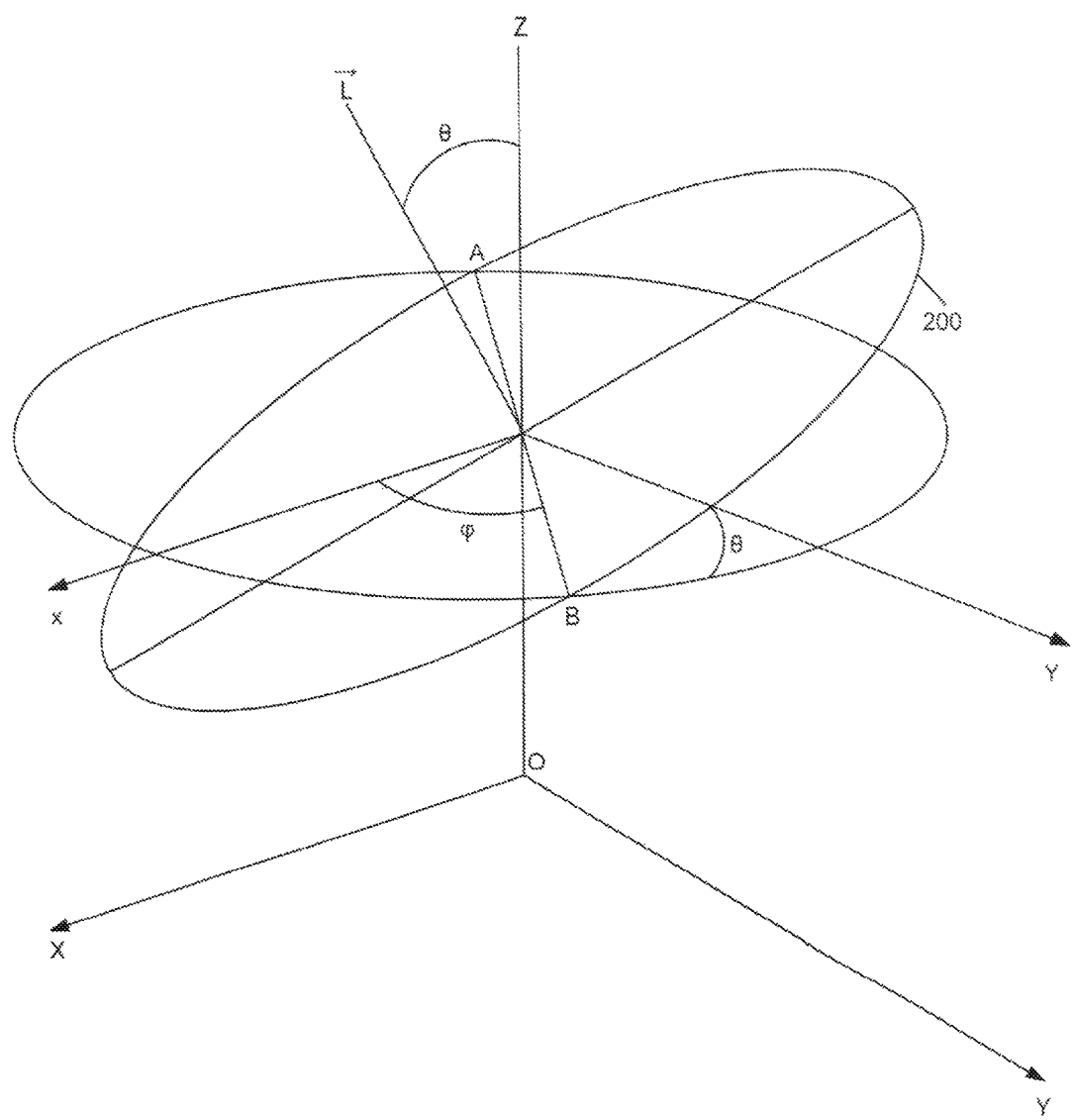
FIG. 9 is a graph depicting the geometry of the energy storage ring of FIG. 1 in a perturbed state during operation in which its angular momentum axis, L, has become rotated away from the vertical direction by the angle θ about a line of nodes in the horizontal plane at azimuth φ.

Referring to FIG. 9, the geometry of the ring 200 in a perturbed state of rotation during operation of the energy storage apparatus 100 is shown, in which the ring's 200 angular momentum vector, $\vec{L}$, has become rotated away from the ring's 200 nominal vertical, z-axis direction by the angle $\theta$ about a line of nodes in the nominal horizontal plane at an azimuth angle $\phi$. The air gap sensors 802 of the levitation magnets provide the data to the control system computer 804, which calculates the vertical position of the ring center of mass as well as the two perturbation angles $\theta$ and $\phi$. In addition to controlling the vertical (z-coordinate) displacement of the ring centre of mass, the levitation electromagnets 306 are also required to supress this unwanted perturbation in ring orientation. The rotating ring 200 behaves dynamically like a gyroscope. Rotating the angular momentum vector, $\vec{L}$, negatively through the angle $\theta$, to reduce the angle to zero and restore the ring nominal orientation parallel to the vertical z-axis, is achieved by imposing a precessional torque on the ring angular momentum. In the example embodiment shown, this involves increasing the vertical force of attraction generated by the levitation electromagnets 306 at the "far end" of the line of nodes, designated as "A" in FIG. 9 and decreasing the vertical force of attraction generated by the levitation electromagnets 306 at the "near end" of the line of nodes, designated as "B", in FIG. 9.

Figure 10:
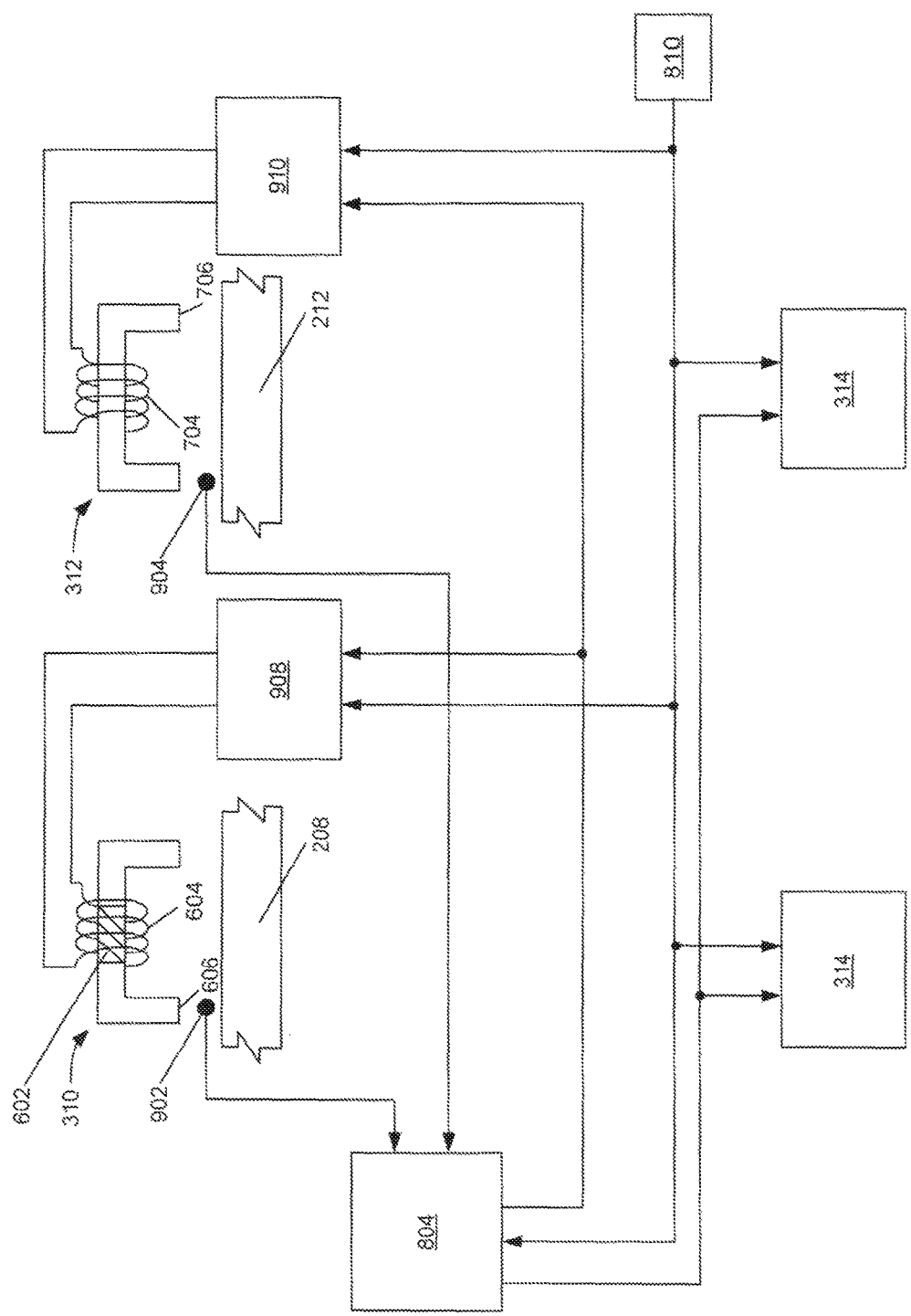
FIG. 10 is a block diagram depicting another portion of the control system of the energy storage apparatus of FIG. 1 for controlling radial displacement the energy storage ring of FIG. 1.

Referring to FIG. 10, a block diagram illustrating another portion of the control system of FIG. 1 for controlling radial displacement of the discrete subassemblies 302 of FIG. 3 will now be described. FIG. 10 shows the upper centering electromagnet 310 engaging the upper centering rail 208. The upper centering electromagnet 310 includes a permanent magnet core 602 and an electromagnet coil 604 that wraps around the permanent magnet core 602. FIG. 10 also shows the lower centering electromagnet 312 engaging the lower centering rail 212 and includes only the electromagnet coil 704.

An air gap sensor 902 is disposed on the pole face 606 of the upper centering electromagnet 310 and an air gap sensor 904 is disposed on the pole face 706 of the lower centering electromagnet 312. Air gap sensor 902 measures an air gap between the pole face 606 of the upper centering electromagnet 310 and the upper centering rail 208 at kilo-Hertz rates, such as for example, 0.5-1.5 kHz, and provides the air gap measurement to the control computer 804 of the control system 400. Similarly, air gap sensor 904 measures an air gap between the pole face 706 of the lower centering electromagnet 312 and the lower centering rail 212 at kilo-Hertz rates and provides the air gap measurement to the control computer 804. The control computer 804 determines the increment or decrement to the current supplied to the electromagnet coils 604, 704 of the upper and lower centering electromagnets 310, 312, respectively, required to null out the x, y horizontal displacements of the centre of mass of the ring 200. The control computer 804 also determines the increment or decrement to a length of the radial actuator 322 of the radial compensator module 314 which controls the radial position of the discrete subassemblies 302 required to null out the effects of $r-r_0$ (e.g. the difference between a current radius of the ring, r, and the nominal radius of the ring $r_0$) by imposing suitable radial displacements on position of the discrete assemblies 302.

The control computer 804 may also determine differential air gap measurements between the upper and lower centering electromagnets 310, 312 at each of the discrete subassemblies 302. The differential air gap measurements may be used to detect and suppress a variety of modes of oscillation of the ring 200.

The control computer 804 may be configured to send commands to DC power control amplifiers 908, 910 connected to the upper and lower electromagnets 310, 312, respectively, to change a current supplied to the electromagnet coils 604, 704 and to the radial compensator controller 320 to implement change a radial position of the discrete subassemblies 302. AC power may be provided from an AC power source 810 to the radial compensator controller 320 of the radial compensator module 314 of the discrete subassemblies 302 and the DC power control amplifiers 908, 910.

Figure 11:
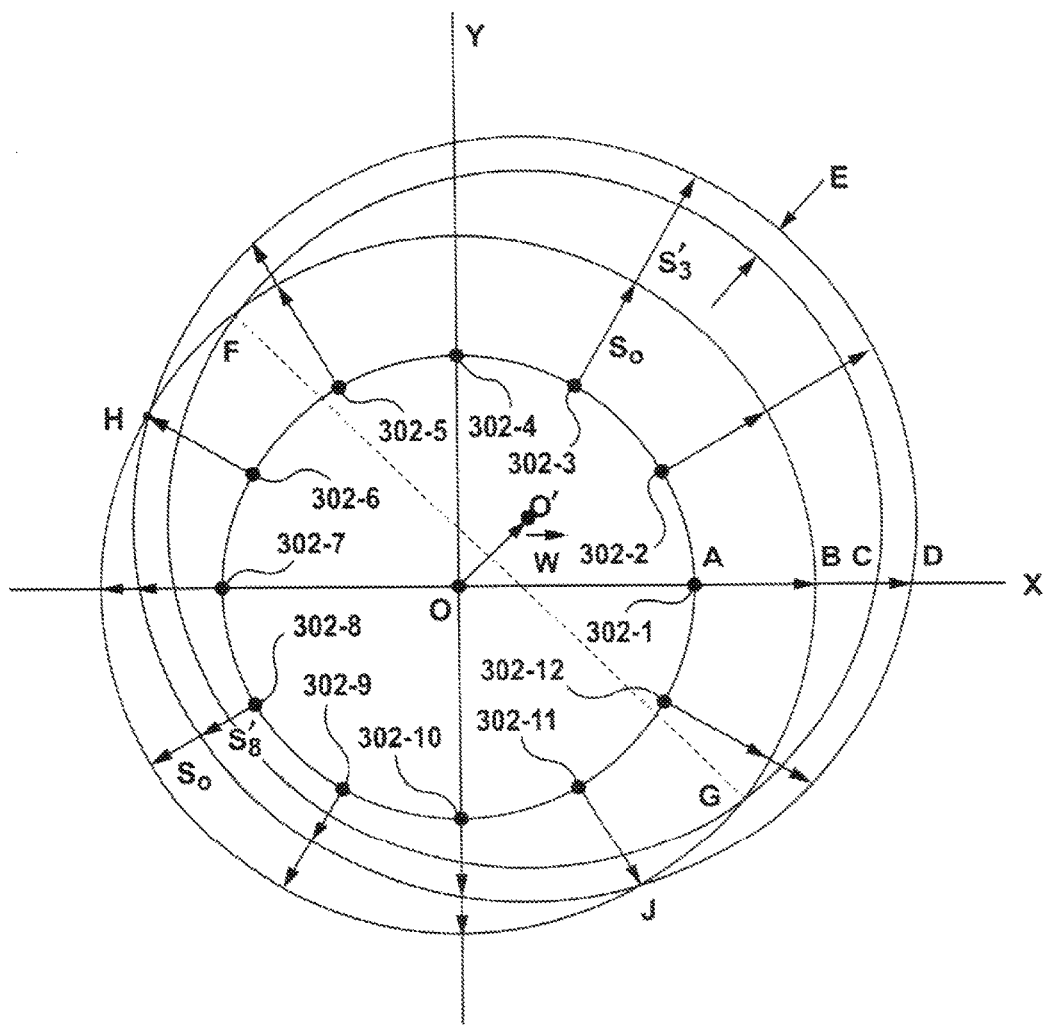
FIG. 11 is a graph depicting the geometry of the energy storage ring of FIG. 1 in a perturbed state during operation with its center of mass displaced from the origin of coordinates at O by the vector $\vec{W}$ and it radius incremented by "E".

Referring to FIG. 11, the geometry of the ring 200 in a perturbed state during operation of the energy storage apparatus 100 is shown, in which the center of mass of the ring 200 is displaced from the origin of coordinates at O to the position O' by the displacement vector $\vec{W}$ and the radius of the ring 200 is incremented by "E". In FIG. 11, the circle labeled "A" represents the circular arrangement of discrete subassemblies 302 with the black dot representing the pole faces of the upper centering electromagnets 310 and the lower centering electromagnets 312. Each respective radial compensator module 314 individually controls a respective discrete subassembly 302 so that all the discrete subassemblies 302, at all times, are located on a circle of common radius with a common center at the origin of coordinates, O. The radius of the common circle, with its origin at O, on which the upper and lower centering electromagnets 310, 312 of each discrete subassembly 302 are all located, is controlled by the radial compensators to vary with time according to variations in the radius of the ring 200 generated by variations in the rate of rotation of the ring 200. The circle labeled "B" represents the upper centering rail 208 and the lower centering rail 212, on the inner peripheral surface 206 of the ring 200 which is also shown to be centered on the origin O sharing a common center along with the circle of the upper and lower centering electromagnets 310, 312, but separated from the upper and lower centering electromagnets 310, 312 on circle "A" by a separation air gap $S_0$. The separation air gap $S_0$ is to be maintained at the constant value $S_0$ at the upper and lower centering electromagnets 310, 312 at all times by the control system.

FIG. 11 illustrates a center of the ring 200 becoming displaced by a displacement vector $\vec{W}$ from the origin O to a displaced position O' with the ring 200 now occupying the position of the circle labeled "C". In addition, FIG. 11 illustrates a case in which the ring 200 has also suffered an increase in radius by an amount shown as "E" and the displaced ring 200 with an increased radius now occupies the position of the circle labeled "D". As a consequence of the displacement of the center of the ring 200 and the increase in the radius of the ring 200, the separation air gaps of the upper and lower centering magnets 310, 312 are all altered from their standard separation air gap values of $S_0$ to new values $S'_k$; k=1, 2, 3, . . . , 12 as shown in FIG. 11. The air gap separations, $S'_k$; k=1, 2, 3, . . . , 12 of the displaced and radius altered ring 200 contain the information necessary to calculate the x- and y-components of the displacement vector $\vec{W}$ and the increment to the ring radius "E". These quantities are the centering control system error signal parameters which the ring centering control system must null out. The control system 400 nulls out the increase in radius "E" by activating the radial compensator modules 314 to displace the subassemblies 302 to a new radial position, with a new common radius centered on the origin O, increased by an amount "E" from the initial common radius. The control system then increases the current in the coils of the upper and lower centering electromagnets 310, 312 of the active centering set which lie in the direction of the azimuth of the ring displacement vector $\vec{W}$ to impose inward radial, attractive centering forces on the energy storage ring, accelerating the ring 200 towards the origin O and nulling out the displacement vector $\vec{W}$.

The operation of the system 10 will now be described with reference to FIG. 1. The power management system 30 routes dispatchable electrical energy from the source 20 to the sink 40, as well as to and from the linear synchronous motor/generators 500 of the energy storage apparatus 100. The energy storage apparatus 100 may operate autonomously off grid. The power management system 30 may optionally be connected to the power grid 50 for importing electrical energy from and for exporting electrical energy to, the power grid 50.

A maximum operational energy storage capacity of the ring 200 is determined by the requirement that the stresses induced in the ring 200 by the inertial forces of rotation are never permitted to exceed a fraction k, 0<k<1, of the yield tensile strength of the ring. The reciprocal, $k^{-1}$, is referred to as the operational stress margin and is typically expected to be of the order of $2 < k^{-1} < 3$. The minimum operational energy storage capacity of the ring 200 is set by the maximum depth of discharge which is typically expected to be of the order of 0.99.

Electrical energy can flow bi-directionally to and from the synchronous linear motor/generators 500 appearing as increments or decrements to the kinetic energy of the rotating ring 200. When the power output of the source 20 is in excess of that required by the sink 40, excess electrical power is directed towards the linear synchronous motor/generators 500 of the energy storage apparatus 100 which, acting as motors, impose positive torques on the ring 200 and accelerates a rate of rotation of ring 200, thereby increasing the kinetic energy stored in the ring 200. In this state, the ring 200 is "charging". Charging of the ring 200 is terminated whenever the rotating ring 200 reaches a maximum permissible operational rate of rotation, beyond which stresses in the ring 200 resulting from inertial forces of rotation causes the ring 200 to exceed the maximum rated value of operational stress. When this condition is realized, no more energy may be stored in the ring 200. In the event the electrical energy output of the source 20 cannot be curtailed; any further electrical energy output from the source 20 may be either exported to the power grid 50 or "dumped" locally.

When the electrical power output of the source 20 is less than that required by the sink 40, the power deficit may be made up from kinetic energy stored in the ring 200. In this case, the linear synchronous motor/generators 500, acting as generators, impose negative torques on the rotating ring 200 and retard the rotation rate of the ring 200, decreasing the kinetic energy stored in the ring 200. In this state, the linear synchronous motor/generators 500 deliver electrical energy to the sink 40 and the ring 200 is "discharging". Ring 200 discharging is terminated whenever the kinetic energy content or the ring 200 reaches a minimum operational level established by the operational maximum depth of discharge. If this condition is realized, no more energy may be extracted from the ring 200 and any further electrical power demand from the sink 40 may be met by importing power from the grid.

The system 10 may also store conventionally generated electrical energy for purposes of time shifting peak power demand and shaving peak power demand in an electrical grid.

The control system 400 of the energy storage apparatus 100 may be powered by the UPS 600 supported by the power management system 30 and the bi-directional electrical power destined for entering or leaving the ring 200 through the linear synchronous motor/generators 500. The UPS 600 is kept charged by electrical energy destined for entering and leaving the linear synchronous motor/generators 500 and enables the energy storage apparatus 100 to be operated "off grid". The UPS 600 also provides a safety measure in the event of a grid power failure. The transition from ring charging to ring discharging is accomplished by a reversal of phase of one of the three phase windings on the linear synchronous motor/generators 500, which switches the linear synchronous motor/generators 500 from "motor mode" to "generator mode" and vice versa.

Using UPS 600 in the power management system 30 ensures that the power delivered to the energy storage apparatus 100 is smooth and continuous across electrical current reversals which occur during transitions from ring 200 charging to ring 200 discharging and vice versa. In addition, batteries of the UPS 600 and the power management system 30 store enough electrical energy to raise the touchdown bearing 316 of each discrete subassembly 302 and support the ring 200 in the event of: (1) a failure of the levitation electromagnet; (2) failure of the linear synchronous motor/generators 500; and (3) accidental depletion of ring 200 electrical energy below its maximum operational depth of discharge while the source 20 is not generating.

Figure 12:
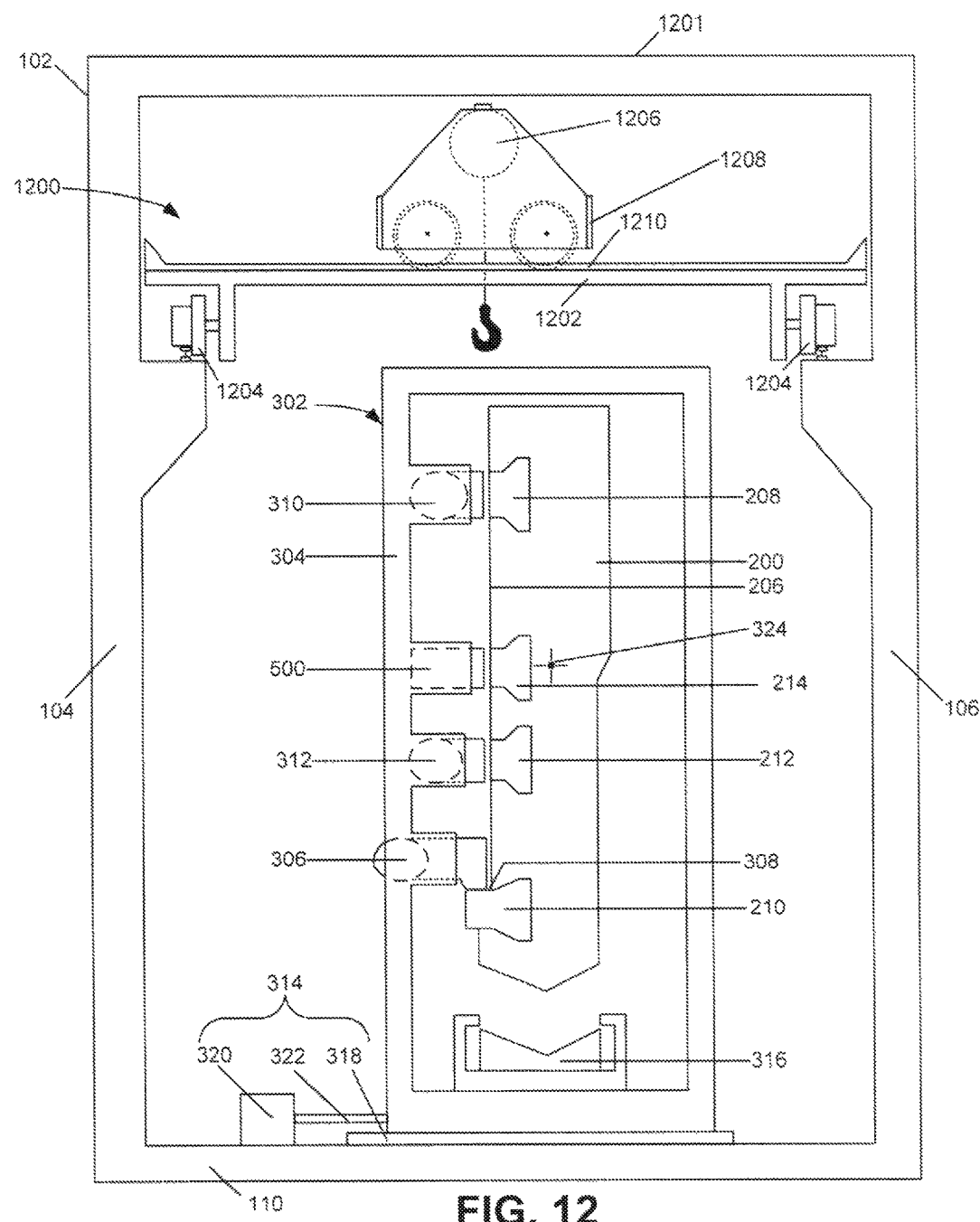
FIG. 12 is a side view of a subassembly of the assembly of FIG. 3 housed within a containment structure in accordance with the embodiment.
Figure 13:
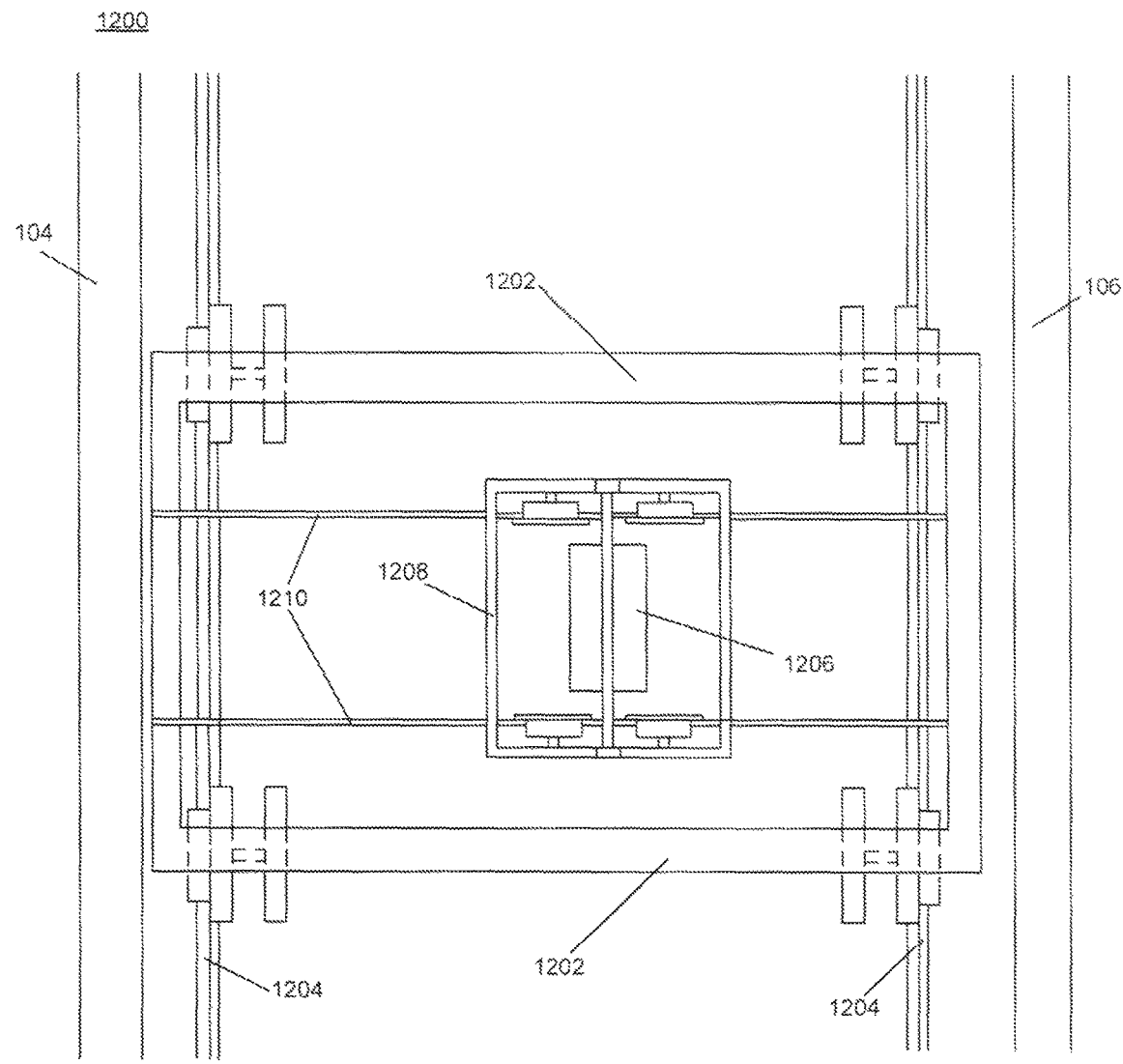
FIG. 13 is a top view of the energy storage ring gantry service system of FIG. 12.

Referring to FIG. 12 and FIG. 13, an embodiment of an overhead gantry service system 1200 (referred to hereinafter as gantry service system 1200) used for servicing the energy storage apparatus 100 is shown. In this example embodiment, the containment structure 102 includes a roof 1201 having at least one access port (not shown). Each access port (not shown) is for accessing a service area within the containment structure 102 that is located between adjacent discrete subassemblies 302. The gantry service system 1200 is housed inside the containment structure 102 and disposed above each discrete subassembly 302 as shown in FIGS. 12 and 13. Each of the levitation electromagnet 306, the upper centering electromagnet 310, the lower centering electromagnet 312, and the motor/generators 500 of the energy storage apparatus 100 are swappable and thus may be removed from each discrete subassembly 302 by the gantry service system 1200. The gantry service system 1200 includes a wheeled, primary truck 1202 which travels along a pair of circular rails 1204 mounted high on the inner wall 104 and an outer wall 106 of the containment structure 102. The primary truck 1202 may be positioned above any of the discrete subassemblies 302. A service winch 1206 is mounted on a four wheeled, secondary truck 1208 sitting on a set of cross rails 1210 attached to the primary truck 1202 which allow the service winch 1206 to travel radially, back and forth, between the inner and outer walls 104, 106 of the containment structure 102.

The service winch 1206 may be configured to hoist items such as, for example: structural parts, a levitation electromagnet 306, an upper centering electromagnet 310, a lower centering electromagnet 312, and a linear synchronous motor/generator from a discrete subassembly 302 and transport such items around the containment structure 102 to service areas located between the discrete subassemblies 302. When the service winch 1206 is positioned in one of the service areas, the items transported by the service winch 1206 may be placed on the floor 110 of the containment structure 102, or on a bench. Replacement items may be lowered to the floor 10 through an access port (not shown) in a roof of the containment structure 102 above the service areas by an outside crane. The replacement items may then be subsequently picked up by the service winch 1206 and carried to one of the discrete subassemblies 302 for mounting.

The gantry service system 1200 may be power by a "third rail" arrangement or may be driven manually from below by chain loops. When the ring 200 is being serviced, the ring 200 will not be rotating. In cases where the energy storage apparatus 100 is operating "off grid", electrical energy for the gantry service system 1200 may be supplied by the charged batteries of the UPS 600 or by a local generator for the duration of the servicing task.

As mentioned above, the motor/generators 500 of the energy storage apparatus 100 shown in FIGS. 1, 2, and 3 are linear synchronous motor/generators 600. The linear synchronous motor/generators 500 are about 95% efficient and hence will lose about 5% of the energy passing through them in either direction both as motors and as generators. This is the largest single source of heat in the interior of the containment structure 102. Besides the energy dissipation in the motor/generators, there is the energy dissipation in the levitation rail 210 and the upper and lower centering rails 208, 212 by eddy currents and hysteresis as well as Ohmic losses in the electromagnet coil 504 of the levitation electromagnet 306, the electromagnet coil 604 of the upper centering electromagnet 310, and the electromagnet coil 704 of the lower centering electromagnet 312. The energy storage apparatus 100 may include a method of dissipating heat from the motor/generators. The heat dissipation may be implemented passively or it may include a closed cycle heat exchange system (not shown) to directly cool the motor/generators 500. The closed cycle heat exchange system may include a first heat exchanger in the motor/generators and a second heat exchanger outside the containment structure 102. A low temperature fluid absorbs heat from the motor/generators as the low temperature fluid passes through the first heat exchange in the motor/generators and absorbs heat from the motor/generators. The high temperature fluid is then passed out through a wall or a roof of the containment 102 into the second heat exchanger, which gives up heat to the atmosphere. The fluid is then returned, as low temperature fluid, to the first heat exchanger at the motor/generators.

The closed cycle heat exchange system may also include internal heat exchanger radiators attached to an internal ceiling and/or walls of the containment structure 102. As the ring 200 rotates within the containment structure 102, circulating air within the containment structure 102 generated by the rotation of the ring 200 forces the circulating air to pass through the internal heat exchangers. Low temperature fluid enters the internal heat exchangers, absorbing heat from the air, and leaves as high temperature fluid passing out through the walls or roof of the containment structure 102 to the second set of heat exchangers on the exterior of the structure, giving up heat to the atmosphere, and returning again as low temperature fluid to the internal heat exchangers on the walls and/or ceiling of the containment structure 102.

Figure 14:
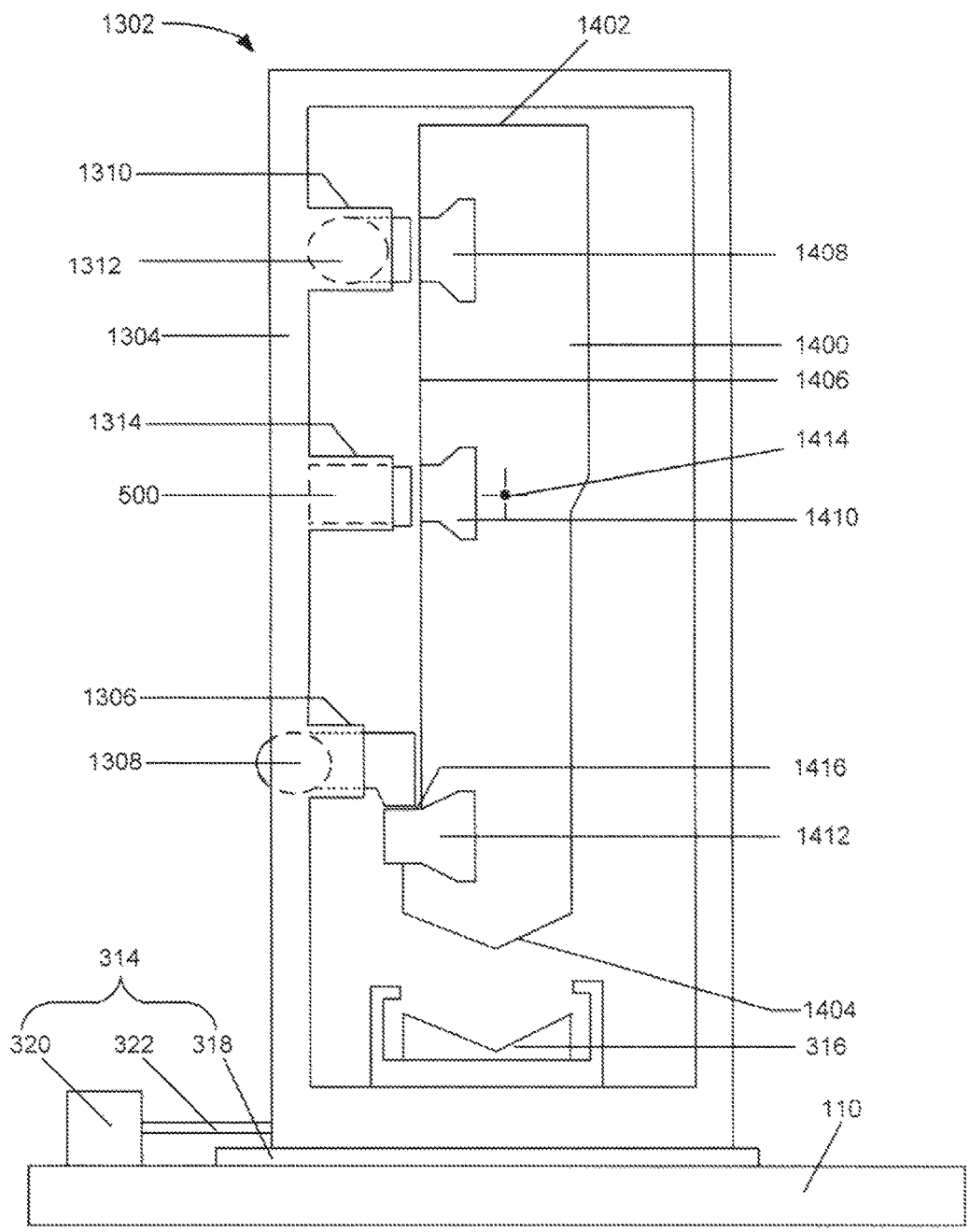
FIG. 14 is a side view of a subassembly of the assembly of the energy storage system in accordance with another embodiment.

It will be appreciated that although the ring 200 includes both upper and lower centering rails 208, 212, in an alternative embodiment the energy storage ring may include a single centering rail. Referring to FIG. 14, a side view of another example embodiment of one of the discrete subassemblies 1302 of the assembly 300 of the energy storage apparatus 100 is shown. In the example embodiment shown in FIG. 14, the energy storage ring is depicted by reference number 1400 and is referred to hereinafter as ring 1400. The ring 1400 includes a top 1402, a bottom 1404, and an inner peripheral surface 1406. A single centering rail 1408 is disposed near the top 1402 of the ring 1400, a levitation rail 1412 is disposed near the bottom 1404 of the ring 1400, and a motor/generator reaction rail 1410 is disposed between the centering rail 1408 and the levitation rail 1412 at the cross sectional center of mass 1414 of the ring 1400. The construction of the ring 1400 is similar to that of ring 200 and will therefore not be described in detail.

The discrete subassembly 1302 includes an independent support 1304 that surrounds a portion of the energy storage ring 1400. The independent support 1304 includes a first mechanical support 1306 configured to releasably attach to a levitation electromagnet 1308 such that pole faces of the levitation electromagnet 1308 oppose a top protruding surface 1416 of a levitation rail 1412. The independent support 1304 also includes a second mechanical support 1310 configured to releasably attach to a centering electromagnet 1312 such that pole faces of the centering electromagnet 1312 oppose a surface of the centering rail 1408 and a third mechanical support 1314 configured to releasably attach to one of the motor/generators 500. The one motor/generator 500 configured to electromagnetically engage the motor/generator reaction rail 1410 of the ring 1400 and impose a reversible torque on the ring 1400 to enable bi-directional transfer of electrical energy from source 20 into kinetic energy of rotation of the ring 1400 and subsequent recovery of electrical energy from the kinetic energy of rotation of the ring 1400.

The discrete assembly 1302 also includes the radial compensator module 314 and the touchdown bearing 316. The radial compensator module 314 includes radial compensator rails 318 mounted on a floor 110 of the containment structure 102, and a radial compensator controller 320 attached to the independent support 304 via a radial compensator actuator 322. The touchdown bearing 316 may be raised using a vertical displacement mechanism, such as for example, hydraulic scissor jacks or hydraulic rams, to support the ring 1400 when the ring 1400 is not levitated and rotating.

The operation of the assembly 300 with discrete subassemblies 1302 is similar to the embodiment described above and hence is not repeated herein.

Figure 15:
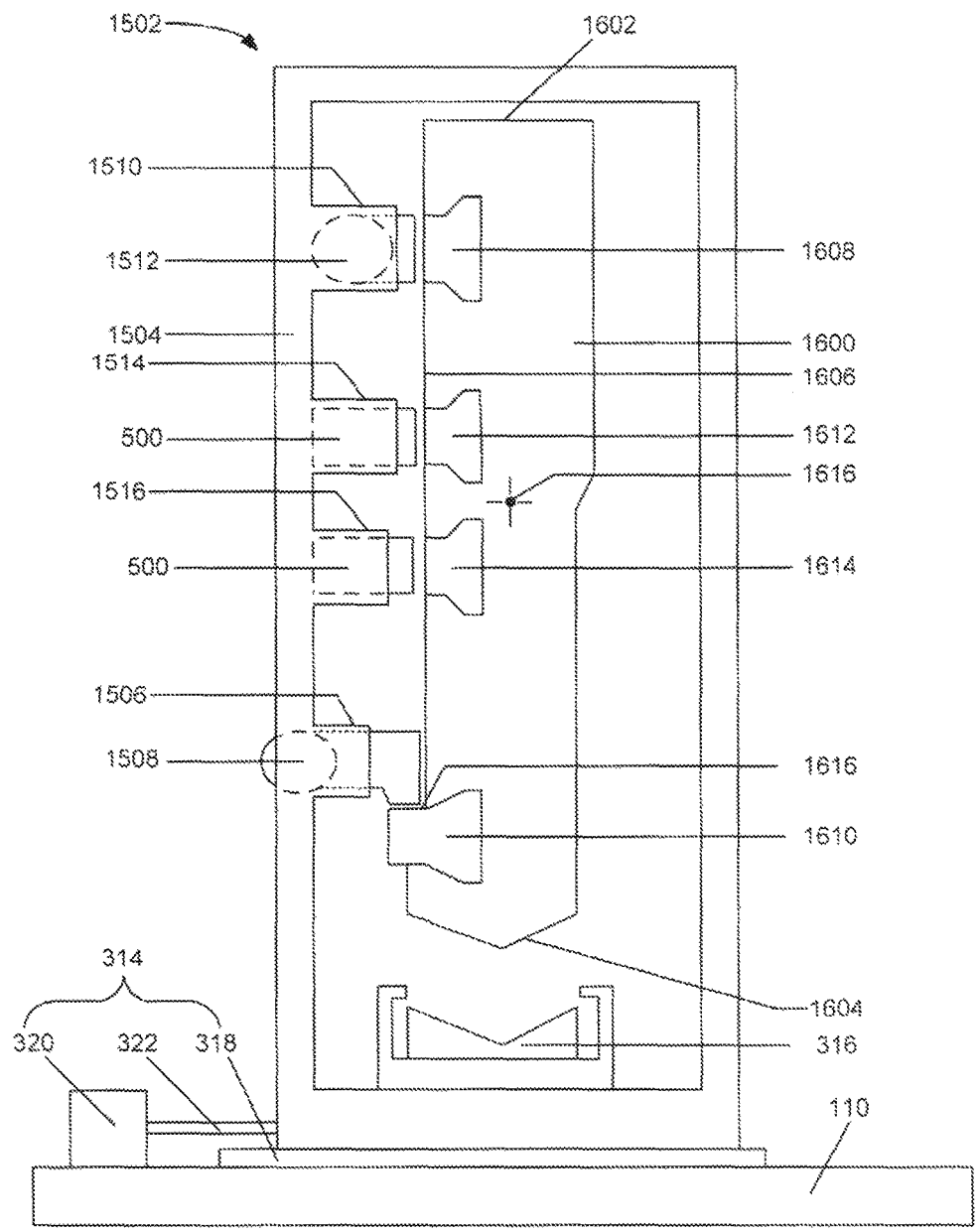
FIG. 15 is a side view of a subassembly of the assembly of the energy storage system in accordance with still another embodiment.

In still another alternative embodiment, the energy storage ring may include a single centering rail and two motor/generator reaction rails. Referring to FIG. 15, a side view of another example embodiment of one of the discrete subassemblies 1502 of the assembly 300 of the energy storage apparatus 100 is shown. In the example embodiment shown in FIG. 15, the energy storage ring is depicted by reference number 1600 and is referred to hereinafter as ring 1600. The ring 1600 includes a top 1602, a bottom 1604, and an inner peripheral surface 1606. A single centering rail 1608 is disposed near the top 1602 of the ring 1600, a levitation rail 1610 is disposed near the bottom 1604 of the ring 1600, and two motor/generator reaction rails 1612, 1614 are disposed between the centering rail 1608 and the levitation rail 1610. The first motor/generator reaction rail 1612 is disposed above the cross sectional center of mass 1616 of the ring 1600 and the second motor/generator reaction rail 1614 is disposed below the cross sectional center of mass 1616 of the ring 1600. The construction of the ring 1600 is similar to that of ring 200 and will therefore not be described in detail.

The discrete subassembly 1502 includes an independent support 1504 that surrounds a portion of the energy storage ring 1600. The independent support 1504 includes a first mechanical support 1506 configured to releasably attach to a levitation electromagnet 1508 such that pole faces of the levitation electromagnet 1508 oppose a top protruding surface 1616 of the levitation rail 1610. The independent support 1504 also includes a second mechanical support 1510 configured to releasably attach to a centering electromagnet 1512 such that pole faces of the centering electromagnet 1512 oppose a surface of the centering rail 1608, a third mechanical support 1514 configured to releasably attach to a first one of the motor/generators 500 and a fourth mechanical support 1516 configured to releasably attach to a second one of the motor/generators 500. The first and second motor/generators are configured to electromagnetically engage the motor/generator reaction rails 1612, 1614, respectively, of the ring 1600 and impose a reversible torque on the ring 1600 to enable bi-directional transfer of electrical energy from source 20 into kinetic energy of rotation of the ring 1600 and subsequent recovery of electrical energy from the kinetic energy of rotation of the ring 1600.

The discrete assembly 1502 also includes the radial compensator module 314 and the touchdown bearing 316.

The radial compensator module 314 includes radial compensator rails 318 mounted on a floor 110 of the containment structure 102, and a radial compensator controller 320 attached to the independent support 304 via a radial compensator actuator 322. The touchdown bearing 316 may be raised using a vertical displacement mechanism, such as for example, hydraulic scissor jacks or hydraulic rams, to support the ring 1600 when the ring 1600 is not levitated and rotating.

Those skilled in the art will appreciate that in some implementations, the functionality of the control system 400 may be implemented using pre-programmed hardware or firmware elements (e.g., application specific integrated circuits (ASICs), electrically erasable programmable read-only memories (EEPROMs), etc.), or other related components. In other implementations, the functionality of the control system 400 may be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

The described embodiments are to be considered in all respects only as illustrative and not restrictive. The scope of the claims should not be limited by the preferred embodiments set forth in the examples, but should be given the broadest interpretation consistent with the description as a whole. All changes that come within meaning and range of equivalency of the claims are to be embraced within their scope.

What is claimed is:

1. An energy storage apparatus comprising:
    an energy storage ring for storing kinetic energy of rotation, the energy storage ring comprising a non-magnetic, high permeability, high resistivity levitation rail protruding from an inner peripheral surface of the energy storage ring, a non-magnetic, high permeability, high resistivity centering rail at the inner peripheral surface of the energy storage ring, and a motor/generator reaction rail at the inner peripheral surface of the energy storage ring;
    an assembly comprising a plurality of independent supports, each independent support releasably attachable to a levitation electromagnet such that pole faces of the levitation electromagnet oppose a top protruding surface of the levitation rail of the energy storage ring and releasably attachable to a centering electromagnet such that pole faces of the centering electromagnet oppose a surface of the centering rail of the energy storage ring;
    at least two motor/generators; and
    a control system coupled to the assembly and each of the at least two motor/generator, the control system configured to supply current to each levitation electromagnet of the assembly to generate vertical forces to levitate and vertically stabilize the energy storage ring, to supply current to each centering electromagnet of the assembly to generate radial forces to center and horizontally stabilize the energy storage ring, and to control each of the at least two motor/generators to electromagnetically engage the reaction rail of the energy storage ring and impose a reversible torque on the energy storage ring to enable bi-directional transfer of electrical energy from an energy source external to the energy storage ring into kinetic energy of rotation of the energy storage ring and subsequent recovery of electrical energy from the kinetic energy of rotation of the energy storage ring.

2. The energy storage system of claim 1, wherein the assembly further comprises:
    a plurality of touch down bearings, each respective touch down bearing configured to support a portion of the energy storage ring when the control system discontinues supplying current to each levitation electromagnet and each centering electromagnet.

3. The energy storage system of claim 2, wherein each respective touch down bearing is radially movable, and wherein the control system is configured to control each respective touch down bearing to radially move the respective touch down bearing to compensate for variations of a radius of the energy storage ring generated by variations in a rate of rotation of the energy storage ring.

4. The energy storage system of claim 1, wherein each respective dependent support is configured to radially move the respective levitation electromagnet and wherein the control system is configured to independently control each independent support to radially move the respective levitation electromagnet to compensate for variations of a radius of the energy storage ring generated by variations in a rate of rotation of the energy storage ring.

5. The energy storage system of claim 1, wherein each respective independent support is configured to radially move the respective centering electromagnet and wherein the control system is configured to control each independent support to radially move the respective centering electromagnet to compensate for variations of a radius of the energy storage ring generated by variations in a rate of rotation of the energy storage ring.

6. The energy storage system claim 1, wherein a first independent support of the plurality of independent supports is configured to releasably attach to a first motor/generator of the at least two motor/generators, wherein a second independent support of the plurality of independent supports is configured to releasably attach to a second motor/generator of the at least two motor/generators, and wherein the first independent support and the second independent support are diametrically opposed.

7. The energy storage system of claim 1, wherein the first independent support is configured to radially move the first motor/generator, wherein the second independent support is configured to radially move the second motor/generator, and wherein the control system is configured to control the first motor/generator and the second motor/generator to compensate for variations of a radius of the energy storage ring generated by variations in a rate of rotation of the energy storage ring.

8. The energy storage system of claim 1, wherein the energy storage ring comprises a second motor/generator reaction rail, wherein the centering rail of the energy storage ring is disposed in a horizontal plane extending through a center of mass of the energy storage ring, and wherein the reaction rail is disposed above the plane extending through the center of mass of the energy storage ring and the second reaction rail is disposed below the plane extending through the center of mass of the energy storage ring.

9. The energy storage system of claim 1, wherein the energy storage ring further comprises a second non-magnetic, high permeability, high resistivity centering rail at the inner peripheral surface of the ring, wherein each independent support is releasably attachable to a second centering electromagnet such that pole faces of the second centering electromagnet face oppose the second centering rail, and wherein the centering rail is disposed above a horizontal plane extending through a center of mass of the energy storage ring and the second centering rail is disposed below the horizontal plane extending through the center of mass of the energy storage ring.

10. The energy storage system of claim 1, wherein each of the at least two motor/generators is a linear synchronous electric motor/generator.

11. The energy storage system of claim 10, the control system is further configured to control a variable frequency drive of each respective linear synchronous electric motor/generator for varying a speed and thrust of the respective linear synchronous electric motor/generator according to varying power demands imposed on the energy storage system.

12. The energy storage system of claim 1, further comprising an uninterruptable power supply (UPS) configured to locally store electrical energy being transferred from the energy source external to the energy storage ring into kinetic energy of rotation of the energy storage ring and electrical energy being recovered from the kinetic energy of rotation of the energy storage ring and transferred to an external user.

13. The energy storage system of claim 12, wherein the UPS is configured to provide electrical power for continuous operation of the control system when the energy storage ring is levitated and rotating.

14. The energy storage system of claim 1, wherein at least one of the levitation electromagnet and the centering electromagnet comprise a permanent magnet core and an electromagnet coil surrounding the permanent magnet core.

15. The energy storage system of claim 1, further comprising a cooling mechanism configured to cool each motor/generator when the energy storage ring is levitated and rotating.

16. The energy storage system of claim 15, wherein the cooling mechanism is further configured to cool the assembly and the control system when the energy storage ring is levitated and rotating.

17. The energy storage ring of claim 1, wherein the assembly comprises three discrete subassemblies arranged around a circumference of the energy storage ring, each respective discrete subassembly spaced equidistant from adjacent discrete assemblies, and each respective discrete subassembly comprising one of the independent supports.

18. The energy storage system claim 17, wherein the at least two motor/generators comprises three motor/generators, and wherein each independent support is releasably attachable to one of the three motor/generators.

19. The energy storage ring of claim 1, wherein the assembly comprises a plurality of discrete subassemblies arranged around a circumference of the energy storage ring, each respective discrete subassembly comprising one of the plurality of independent supports.

20. The energy storage ring of claim 19, wherein the at least two motor/generators comprises a plurality of motor/generators, wherein each independent support is releasably attachable to one of the plurality of motor/generators.

21. The energy storage ring of claim 20, wherein the plurality of discrete subassemblies are arranged in pairs around the circumference of the energy storage ring, each pair of discrete subassemblies comprising a first discrete subassembly and a second discrete subassembly diametrically opposed the first discrete subassembly.

22. The energy storage ring of claim 21, wherein the at least two motor/generators comprise a first motor/generator and a second motor/generator, wherein the independent support of the first discrete subassembly of one of the pairs of discrete subassemblies is releasably attachable to the first motor/generator and wherein the independent support of the second discrete subassembly of the one of the pairs of discrete subassemblies is releasably attachable to the second motor/generator.

23. The energy storage ring of claim 21, wherein the at least two motor/generators comprises a plurality of motor/generators, wherein the independent support of each discrete subassembly of each pair of discrete subassemblies is releasably attachable to one of the plurality of motor/generators.

24. The energy storage system of claim 19, wherein each discrete subassembly comprises:
   a touch down bearing configured to support a portion of the energy storage ring when the control system discontinues supplying current to each levitation electromagnet.

25. The energy storage system of claim 24, wherein the control system is configured to independently control each respective discrete subassembly to vertically displace the touch down bearing from a first position in which the touch down bearing is located directly beneath the energy storage ring and separated from the energy storage ring, to a second position in which the touch down bearing is located directly beneath the energy storage ring and in contact with the energy storage ring to bear a weight of the energy storage ring.

26. The energy storage system of claim 19, wherein each respective discrete subassembly further comprises:
   a radial compensator module coupled to each respective discrete subassembly, each respective radial compensator module comprising a radial actuator for displacing the respective discrete subassembly radially to compensate for variations in a radius of the energy storage ring generated by variations in a rate of rotation of the energy storage ring.

27. The energy storage system of claim 26, wherein the control system is further configured to control each respective radial compensator module.

28. The energy storage system of claim 27, further comprising a plurality of first air gap sensors disposed on the centering electromagnet, each first air gap sensor configured to measure a width of an air gap between pole faces of each respective centering electromagnet and the surface of the centering rail.

29. The energy storage system of claim 28, further comprising a plurality of second air gap sensors disposed on the levitation electromagnet, each second air gap sensor configured to measure a width of an air gap between pole faces of each respective levitation electromagnet and the top protruding surface of the levitation rail.

30. The energy storage system of claim 29, wherein the control system is further configured to process first data received from each first air gap sensor to control the current supplied to each centering electromagnet and to control each respective radial compensator module to maintain a constant measure in the width of the first air gap between pole faces of each respective centering electromagnet and the surface of the centering rail.

31. The energy storage system of claim 30, wherein the control system is further configured to process second data received from each second air gap sensor and to control the current supplied to each levitation electromagnet to maintain a constant measure in the width of the second air gap between pole faces of each respective levitation electromagnet and the top protruding surface of the levitation rail.

32. The energy storage system of claim 1, further comprising:
   a containment structure configured to house the energy storage ring, the containment structure having an internal air pressure that reduce aerodynamic drag of the energy storage ring when the energy storage ring is rotating.

33. The energy storage system of claim 32, wherein the containment structure is circular comprising a rectangular cross-section.

34. The energy storage system of claim 32, wherein the containment structure comprises a roof having at least one access port, each of the at least one access ports for accessing an energy storage ring service area in an interior of the containment structure which is located between adjacent discrete subassemblies.

35. The energy storage system of claim 32, wherein the containment structure is further configured to house a gantry system for transporting replacement components for each respective subassembly.

* * * * *

UNITED STATES PATENT AND TRADEMARK OFFICE
CERTIFICATE OF CORRECTION

PATENT NO. : 9,787,156 B1
APPLICATION NO. : 15/240354
DATED : October 10, 2017
INVENTOR(S) : Wayne Harry Cannon Page 1 of 2

It is certified that error appears in the above-identified patent and that said Letters Patent is hereby corrected as shown below:

On the Title Page

Item (57) in the Abstract, Line 1, replace "A system" with --An apparatus--.

In the Specification

Column 1, Line 40, replace "system" with --apparatus--.

In the Claims

Column 22, Line 18, in Claim 2, replace "system" with --apparatus--.
Column 22, Line 25, in Claim 3, replace "system" with --apparatus--.
Column 22, Line 32, in Claim 4, replace "system" with --apparatus--.
Column 22, Line 40, in Claim 5, replace "system" with --apparatus--.
Column 22, Line 48, in Claim 6, replace "system" with --apparatus--.
Column 22, Line 57, in Claim 7, replace "system" with --apparatus--.
Column 22, Line 57, in Claim 7, replace "1" with --6--.
Column 22, Line 66, in Claim 8, replace "system" with --apparatus--.
Column 23, Line 8, in Claim 9, replace "system" with --apparatus--.
Column 23, Line 20, in Claim 10, replace "system" with --apparatus--.
Column 23, Line 23, in Claim 11, replace "system" with --apparatus--.
Column 23, Line 30, in Claim 12, replace "system" with --apparatus--.
Column 23, Line 37, in Claim 13, replace "system" with --apparatus--.
Column 23, Line 41, in Claim 14, replace "system" with --apparatus--.
Column 23, Line 45, in Claim 15, replace "system" with --apparatus--.
Column 23, Line 49, in Claim 16, replace "system" with --apparatus--.
Column 23, Line 53, in Claim 17, replace "ring" with --apparatus--.
Column 23, Line 59, in Claim 18, replace "system" with --apparatus--.
Column 23, Line 63, in Claim 19, replace "ring" with --apparatus--.

Signed and Sealed this
Twenty-sixth Day of February, 2019

Andrei Iancu
*Director of the United States Patent and Trademark Office*

CERTIFICATE OF CORRECTION (continued)
U.S. Pat. No. 9,787,156 B1

Column 24, Line 1, in Claim 20, replace "ring" with --apparatus--.
Column 24, Line 2, in Claim 20, replace "comprises" with --comprise--.
Column 24, Line 5, in Claim 21, replace "ring" with --apparatus--.
Column 24, Line 11, in Claim 22, replace "ring" with --apparatus--.
Column 24, Line 20, in Claim 23, replace "ring" with --apparatus--.
Column 24, Line 21, in Claim 23, replace "comprises" with --comprise--.
Column 24, Line 25, in Claim 24, replace "system" with --apparatus--.
Column 24, Line 31, in Claim 25, replace "system" with --apparatus--.
Column 24, Line 41, in Claim 26, replace "system" with --apparatus--.
Column 24, Line 50, in Claim 27, replace "system" with --apparatus--.
Column 24, Line 53, in Claim 28, replace "system" with --apparatus--.
Column 24, Line 59, in Claim 29, replace "system" with --apparatus--.
Column 24, Line 65, in Claim 30, replace "system" with --apparatus--.
Column 25, Line 6, in Claim 31, replace "system" with --apparatus--.
Column 25, Line 13, in Claim 32, replace "system" with --apparatus--.
Column 25, Line 20, in Claim 33, replace "system" with --apparatus--.
Column 25, Line 23, in Claim 34, replace "system" with --apparatus--.
Column 25, Line 29, in Claim 35, replace "system" with --apparatus--.